United States Patent
Um et al.

(10) Patent No.: US 7,920,113 B2
(45) Date of Patent: Apr. 5, 2011

(54) ARRAY PANEL AND METHOD OF DRIVING THE SAME

(75) Inventors: Yoon-Sung Um, Yongin-si (KR); Seung-Hoo Yoo, Seongnam-si (KR); Hee-Wook Do, Suwon-si (KR); Hyun-Cheol Moon, Seoul (KR); Kang-Woo Kim, Seoul (KR); Hye-Ran You, Incheon (KR)

(73) Assignee: Samsung Electronics Co., Ltd. (KR)

( * ) Notice: Subject to any disclaimer, the term of this patent is extended or adjusted under 35 U.S.C. 154(b) by 879 days.

(21) Appl. No.: 11/851,988

(22) Filed: Sep. 7, 2007

(65) Prior Publication Data
US 2008/0062340 A1    Mar. 13, 2008

(30) Foreign Application Priority Data
Sep. 8, 2006 (KR) .................. 10-2006-0086969

(51) Int. Cl.
*G09G 3/26* (2006.01)
(52) U.S. Cl. ............... 345/87; 345/92; 345/93; 345/98; 345/100
(58) Field of Classification Search ............ 345/87–100, 345/204–215, 690
See application file for complete search history.

(56) References Cited

U.S. PATENT DOCUMENTS

| | | | |
|---|---|---|---|
| 2008/0198283 A1* | 8/2008 | Yoon et al. | 349/37 |
| 2009/0262106 A1* | 10/2009 | Lu et al. | 345/214 |
| 2010/0066657 A1* | 3/2010 | Park et al. | 345/94 |

* cited by examiner

*Primary Examiner* — Vijay Shankar
(74) *Attorney, Agent, or Firm* — Innovation Counsel LLP

(57) ABSTRACT

An additional capacitor ("sharing capacitor") is provided for each pixel of a liquid crystal display to store the previous voltage on the pixel electrode (i.e. the voltage obtained in the previous frame). At an opportune time after the pixel electrode has begun to charge for the current frame, the sharing capacitor's electrode is coupled to the pixel electrode to combine the pixel electrode's voltage with the sharing capacitor's voltage. As a result, the pixel electrode's voltage is changed to take into account the previous voltage so as to increase the liquid crystal's response speed. More particularly, the sharing capacitor's voltage changes the pixel voltage to provide a greater voltage overshoot or undershoot when the pixel color is changed a lot, so as to increase the liquid crystal response time. Therefore, greater response speed is provided at low power.

5 Claims, 20 Drawing Sheets

ARRAY PANEL AND METHOD OF DRIVING THE SAME

CROSS REFERENCE TO RELATED APPLICATION

This application claims the priority of Korean Patent Application No. 10-2006-086969 filed on Sep. 8, 2006. The entire disclosure of application is incorporated herein by reference.

BACKGROUND OF THE INVENTION (a) Field of the Invention

This invention relates to liquid crystal displays, and more particularly to an array panel for liquid crystal displays.

(b) Description of the Related Art

Liquid crystal displays have been widely used in mobile devices such as laptop computers and cellular telephones. For use in mobile devices, low power consumption is needed. At the same time, a high response speed is needed to display motion pictures.

More particularly, a conventional liquid crystal display applies an electric field to a liquid crystal layer to display an image. The magnitude of the electric field controls the transmittance of light passing through the liquid crystal layer so that a desired image is displayed.

However, a conventional liquid crystal display is not well suited for motion pictures because the liquid crystal molecules have a low response speed. The electric field needs to be increased if a high response speed is desired.

In order to charge a liquid crystal capacitor to a target voltage, a predetermined time is required to obtain a desired brightness due to the dynamic dielectric constant of the liquid crystal. Especially, in case that a voltage difference between a previous voltage charged into the liquid crystal capacitor during a previous frame and the target voltage corresponding to a present frame becomes larger, since the dynamic dielectric constant of the liquid crystal is largely changed, a voltage charged in the liquid crystal capacitor arrives at the target voltage over some frame.

Accordingly, a conventional LCD employs a dynamic capacitance compensation (DCC) method. According to the DCC method, a compensation data is applied to pixels during a present frame based on a difference gray scale between a present image data of the present frame and a previous image data of a previous frame.

However, additional memories are necessary in the conventional LCD employing the DCC method to store the image data corresponding to each frame.

SUMMARY

Some embodiments of the present invention provide an array panel and a display device with an improved response speed at a given voltage. In some embodiments, an additional capacitor ("sharing capacitor") is provided for each pixel to store the previous voltage on the pixel electrode (i.e. the voltage obtained in the previous frame). At an opportune time after the pixel electrode has begun to charge for the current frame, the sharing capacitor's electrode is coupled to the pixel electrode to combine the pixel electrode's voltage with the sharing capacitor's voltage. As a result, the pixel electrode's voltage is changed to take into account the previous voltage so as to increase the liquid crystal's response speed. More particularly, the sharing capacitor's voltage changes the pixel voltage to provide a greater voltage overshoot or undershoot when the pixel color is changed a lot, so as to increase the liquid crystal response time. Therefore, greater response speed is provided.

In an exemplary embodiment of the present invention, the array panel includes a lower substrate, an upper substrate, a first gate line, a second gate line, a data line, a liquid crystal capacitor, a sharing capacitor, a first switching device, and a second switching device. The first gate line receives a first gate pulse and is arranged on the lower substrate. The second gat line receives a second gate pulse and is arranged on the lower substrate. The data line receives a data voltage and is arranged on the lower substrate.

The liquid crystal capacitor includes a pixel electrode, a common electrode, and a liquid crystal layer interposed between the pixel electrode and the common electrode. The sharing capacitor includes a first sharing electrode, a second sharing electrode, and a first insulating layer interposed between the first sharing electrode and the second sharing electrode.

The first switching element is coupled to the first gate line, the data line, and the liquid crystal capacitor and provides the data voltage to the pixel electrode in response to the first gate pulse. The second switching element is coupled to the second gate line, the liquid crystal capacitor and the sharing capacitor and converts the data voltage of the pixel electrode into a compensated data voltage in response to the second gate pulse. The data voltage and the capacitance of the sharing capacitor are determined by the dynamic capacitance of the liquid crystal capacitor.

In an another exemplary embodiment of the present invention, an array substrate includes a liquid crystal capacitor and sharing capacitor. The liquid crystal capacitor is charged by a data voltage in response to a first gate pulse. The charge of the liquid crystal capacitor is mixed with the charge of the sharing capacitor in response to a second gate pulse. The data voltage and the capacitance of the sharing capacitor are determined by the dynamic capacitance of the liquid crystal capacitor, and the sharing capacitor is isolated from the liquid crystal capacitor for the charging time of the liquid crystal capacitor.

Other features and advantages of the invention are described below. The invention is defined by the appended claims.

DESCRIPTION OF SOME EMBODIMENTS

Figure 1:
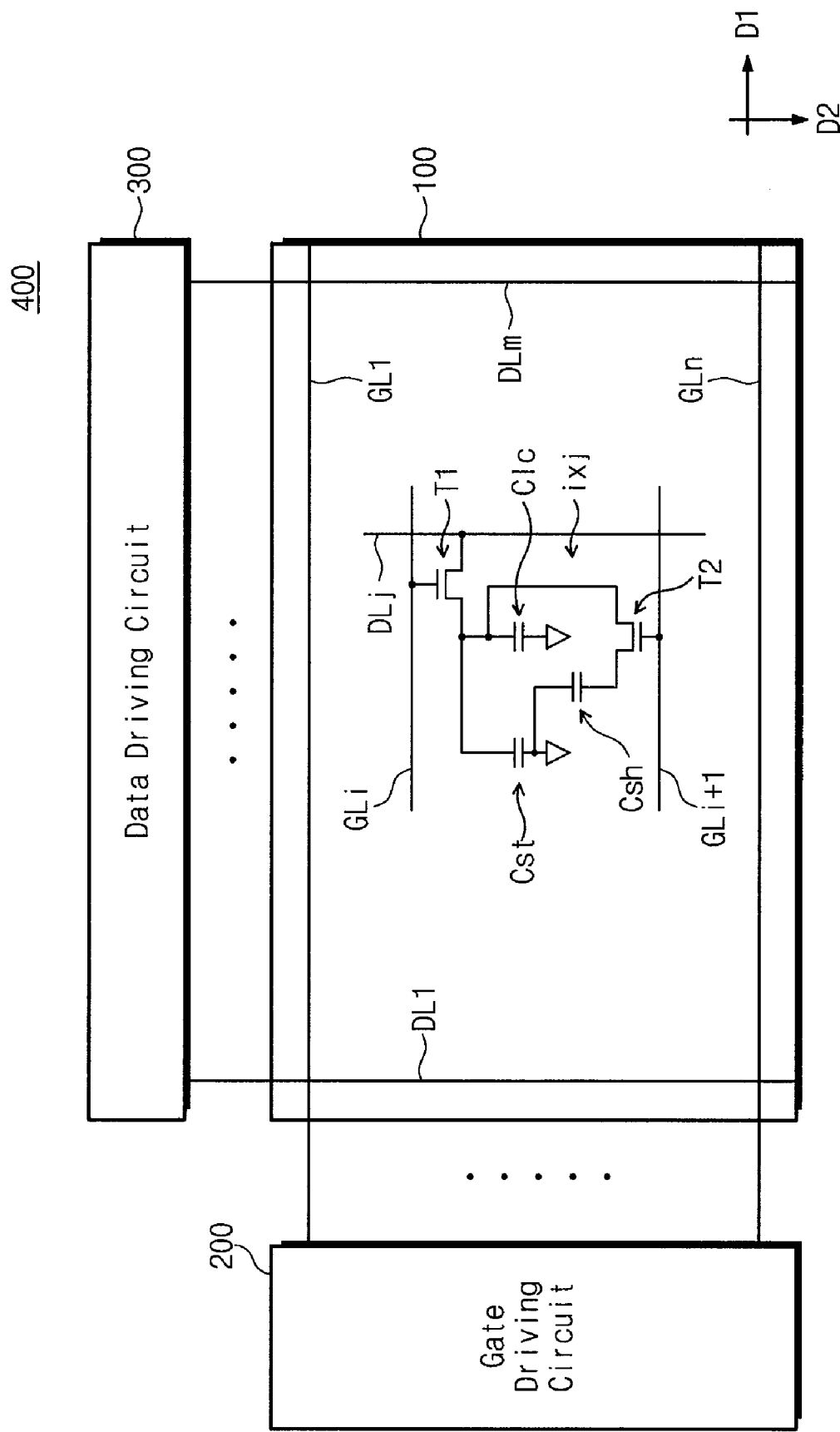
FIG. 1 is a block and circuit diagram of a liquid crystal display device according to some embodiments of the present invention.

Some embodiments of the present invention will now be described more fully with reference to the accompanying drawings.

In the drawings, it will be understood that when an element or layer is referred to as being "on", "connected to" or "coupled to" another element or layer, it can be directly on, connected or coupled to the other element or layer or intervening elements or layers may be present.

An array panel according to the present invention includes a first switching element and a voltage level controller.

The first switching element is coupled to a current gate line, a pixel electrode and a data line.

The current gate line formed on a first base panel receives a first gate pulse and the data line receives a first pixel voltage as a data voltage. The pixel electrode which is coupled to the output electrode of the first switching element receives the first pixel voltage. The voltage level controller includes a second switching element coupled to the pixel electrode The voltage level controller operates in response to the second gate pulse, and changes the first pixel voltage to the second pixel voltage by sharing the first voltage with a previous voltage charged during a previous frame period.

This display device further includes a gate drive circuit, a data drive circuit, a liquid crystal capacitor, a storage capacitor in addition to the first switching element and a voltage level controller.

The gate drive circuit sequentially generates a first gate pulse and a second gate pulse and the data drive circuit generates a first pixel voltage.

The liquid crystal capacitor comprises a pixel electrode which is coupled to the output electrode of the first switching element and receives the first pixel voltage, a common electrode which receives a common voltage and liquid crystal interposed therebetween.

The storage capacitor comprises a storage electrode which receives a common voltage, a pixel electrode and an insulator interposed therebetween.

According to driving method of display device in this invention, the first pixel voltage is charged in a liquid crystal capacitor in response to the first gate pulse and then is stepped down to the second pixel voltage in response to the second gate pulse.

As a sharing capacitor preserves a previous voltage of previous frame and steps down a current pixel voltage by using the previous pixel voltage, a current pixel voltage becomes over-shoot or under-shoot and the response speed of liquid crystal can be increased.

Some embodiments of the present invention will now be described with reference FIG. 1 to FIG. 20.

FIG. 1 is a block and circuit diagram of a liquid crystal display device according to some embodiments of the present invention. The liquid crystal display 400 includes an array panel 100, a gate drive circuit 200 for generating gate pulses, and a data drive circuit 300 for generating data voltages.

The array panel 100 includes gate lines GL1~GLn, data lines DL1~DLm and n×m pixels. The gate lines GL1~GLn extend in a first direction D1 and the data lines DL1~DLm extend in a second direction D2 perpendicular to the first direction D1.

The gate lines GL1~GLn are coupled to the gate drive circuit 200, which sequentially provides a gate pulse to consecutive gate lines.

The data lines DL1~DLm are coupled to the data drive circuit 300 to receive the data voltages.

The voltage polarity of each pixel is inverted every frame. A frame is a time period in which each pixel is driven once with some voltage. A frame is sometimes called a "cycle". Depending on the driving method, the pixel polarity may change from pixel to pixel in the same frame. For example, the pixel polarity can be inverted every row or every two rows (the rows run in direction D1), or can be inverted on every pixel both in each row and each column ("dot inversion").

The gate lines GL1~GLn and the data lines DL1~DLm overlap in a matrix containing (n×m) pixels. All the pixels have an identical structure.

Figure 2:
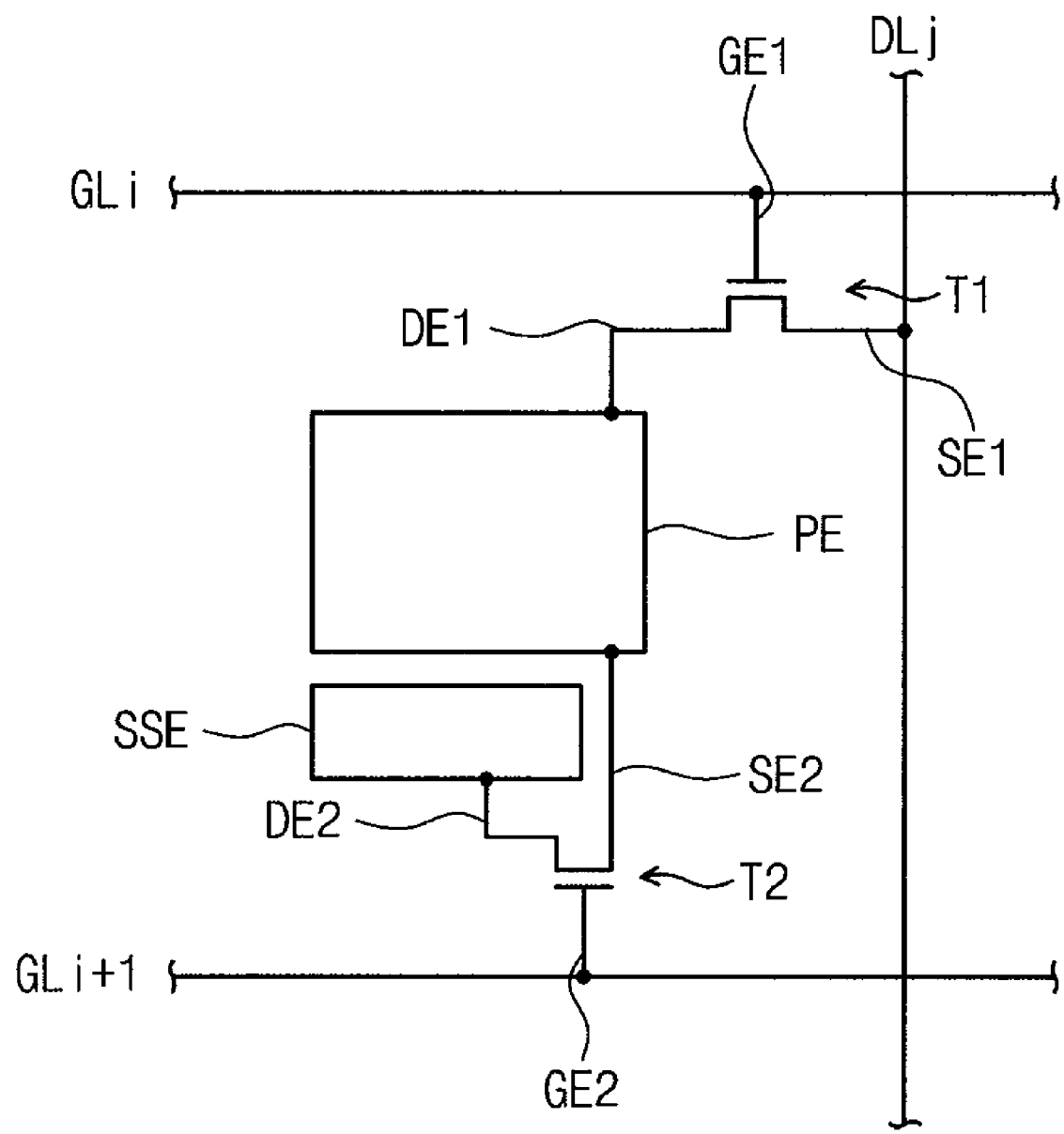
FIG. 2 is a circuit diagram of a pixel of the liquid crystal display shown in FIG. 1.

FIG. 2 is a circuit diagram of a typical pixel (i,j), i.e. a pixel in the ith row and jth column, in the liquid crystal display shown in FIG. 1. The numbers i, j are integers in the range from 1 to n-1 and from 1 to m-1 respectively. The pixel includes a first thin film transistor T1, a liquid crystal capacitor Clc, a storage capacitor Cst, a sharing capacitor Csh and a second thin film transistor T2.

A first gate electrode GE1 of the first thin film transistor T1 is coupled to the i'th gate line GLi, and a first source electrode SE1 is coupled to the j'th data line DLj. A first drain electrode DE1 is coupled to a pixel electrode PE, which provides one capacitor plate (capacitor electrode) of liquid crystal capacitor Clc. The other plate (other electrode) is provided by a common electrode (not shown), and the capacitor dielectric is provided by a liquid crystal layer (not shown) interposed between the pixel electrode PE and the common electrode. The common electrode is formed opposite to the pixel electrode PE.

The storage capacitor Cst is connected in parallel with the liquid crystal capacitor Clc. A first electrode of the storage capacitor Cst is the pixel electrode PE, and a second electrode of the storage capacitor Cst is a storage electrode (not shown in FIG. 2). The storage electrode may receive a common voltage, i.e. the same voltage as the common electrode. An insulator is interposed between the pixel electrode and the storage electrode.

The second thin film transistor T2 includes a second gate electrode GE2 coupled to the i+1'st gate line GLi+1, a second source electrode SE2 coupled to the pixel electrode PE, and a second drain electrode DE2 coupled to the sharing capacitor Csh.

The sharing capacitor Csh includes a first sharing electrode (not shown in FIG. 2) coupled to the storage electrode and a second sharing electrode SSE coupled to the second drain electrode DE2. An insulator is interposed between the first sharing electrode and the second sharing electrode.

Figure 3:
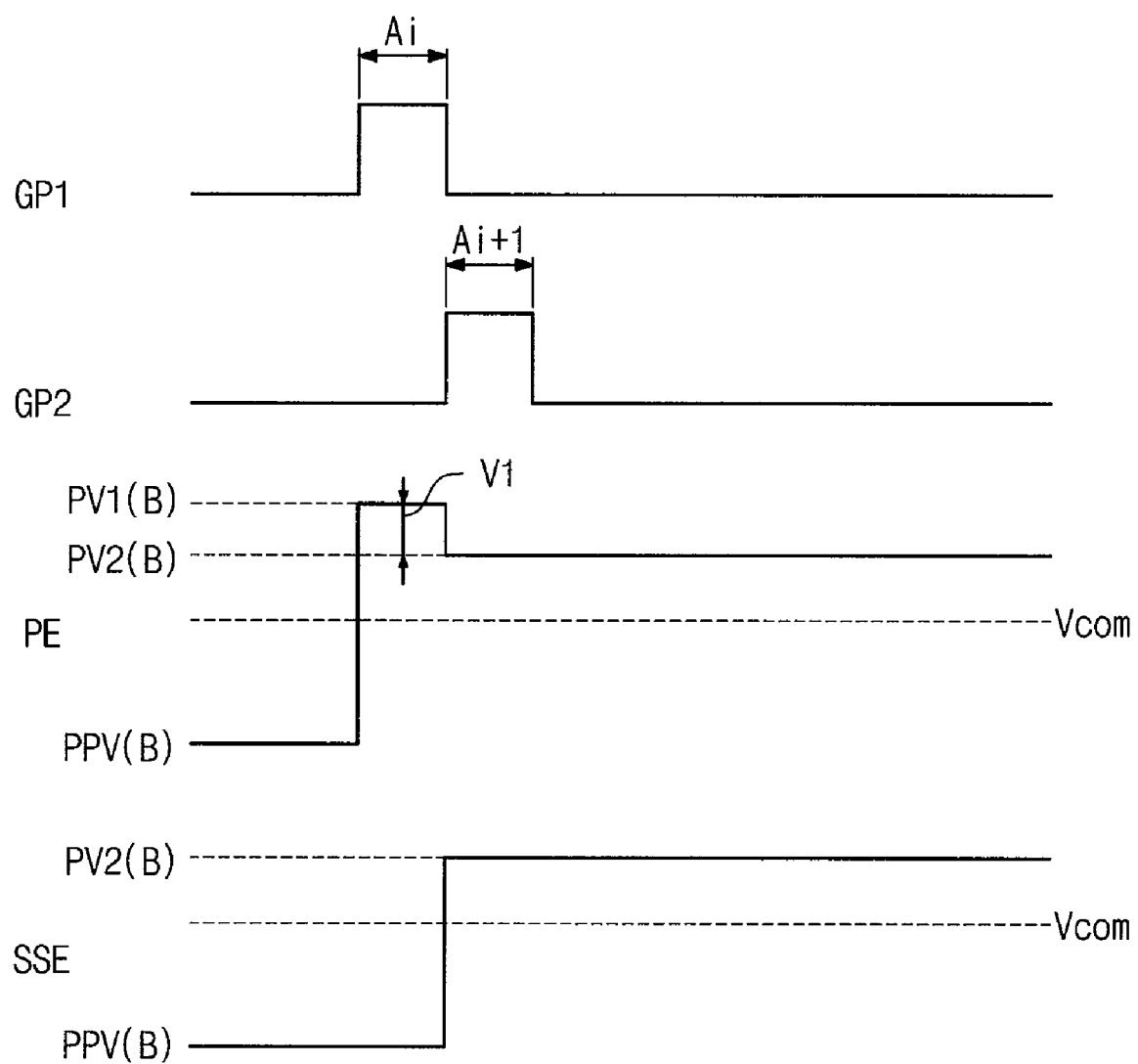
FIG. 3 shows timing diagrams for a pixel according to some embodiments of the present invention.

FIG. 3 shows timing diagrams for pixel voltages. The signals GP1, GP2 are the voltages on the respective gate lines GLi, GLi+1. "Ai" is the i'th active period, i.e. the driving period for the pixels connected to the i-th gate line GLi. Ai is thus the time when the gate pulse is on. When the i-th gate line GLi receives a gate pulse in the i-th active period Ai, the first thin film transistor T1 turns on and provides a first pixel voltage to the pixel electrode PE in response to the data voltage on the j-th data line DLj.

At the same time, the common electrode is at a common voltage Vcom, which is a reference voltage. Therefore, the liquid crystal capacitor Clc is charged to the voltage difference between the first pixel voltage and the common voltage.

During the i+1'st active period Ai+1, which is a driving period for the pixels connected to the i+1'st gate line GLi+1, the pixel electrode PE and the second sharing electrode SSE are coupled to each other through the second thin film transistor T2 in response to the gate pulse of the voltage GP2 applied to the i+1'st gate line GLi+1. The second thin film transistor T2 is turned on right after the first thin film transistor T1 is turned off.

During the i+1'st active period Ai+1, when the pixel electrode PE and the sharing electrode SSE are coupled through the second thin film transistor T2, the liquid crystal capacitor Clc, the storage capacitor Cst and the sharing capacitor Csh equalize their voltages as these capacitors share the charge stored on the pixel electrode PE (charge sharing effect).

Assuming for the sake of illustration that the common voltage is 0V, both the liquid crystal capacitor Clc and the storage capacitor Cst are charged to the first pixel voltage "PV1" during the i'th active period Ai in a current frame. We will assume for the sake of illustration that the first pixel voltage PV1 has positive polarity (relative to the common voltage). At this time, the sharing capacitor Csh is still at a negative-polarity voltage PPV obtained in the previous frame.

During the i+1'st active period Ai+1 of the current frame, the sharing capacitor Csh is coupled to the liquid crystal capacitor Clc and the storage capacitor Cst. Therefore, if "Q" denotes the charge stored in the liquid crystal capacitor Clc and the storage capacitor Cst during the period Ai, then the charge Q on the sharing capacitor Csh become shared among the three capacitors during the period Ai+1. Consequently, the voltage on the liquid crystal capacitor Clc and storage capacitor Cst changes from the first pixel voltage PV1 to a second pixel voltage PV2. The second pixel voltage PV2 can be found from the following equation (1), which expresses the conservation law for the total charge Q' stored by the three capacitors during the periods Ai, Ai+1:

$$Q'=Q+CshPPV=ClcPV1+CstPV1+CshPPV=(Clc+Cst+Csh)PV2 \quad (1)$$

Therefore, $$PV2=\{PV1(Clc+Cst)+CshPPV\}/(Clc+Cst+Csh) \quad (2)$$

According to Equation (2), the second pixel voltage PV2 is a function of the capacitances of the liquid crystal capacitor Clc, the storage capacitor Cst and the sharing capacitor Csh. The capacitance ratio of the storage capacitor Cst vs. the liquid crystal capacitor Clc may be 0:1~20:1 and the capacitance ratio of the sharing capacitor Csh and the liquid crystal capacitor Clc may be 0.1:1~1:1. It is desirable that the capacitance ratio of the liquid crystal capacitor Clc vs. the storage capacitor Cst vs the sharing capacitor Csh is about 1:0.75:0.3 in a patterned vertical alignment (PVA) mode.

Figure 4A:
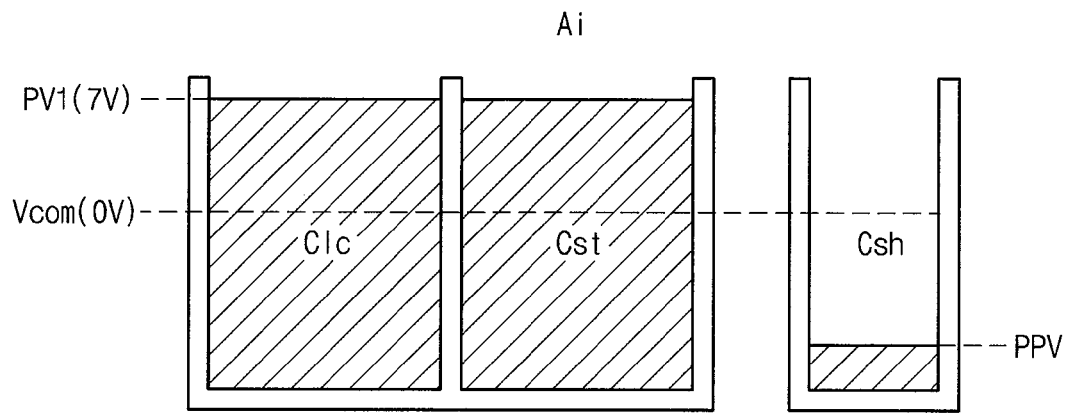
FIG. 4A to FIG. 4C are diagrams for understanding voltage variations of a liquid crystal capacitor, a storage capacitor and a sharing capacitor at different stages illustrated in FIG. 3.
Figure 4B:
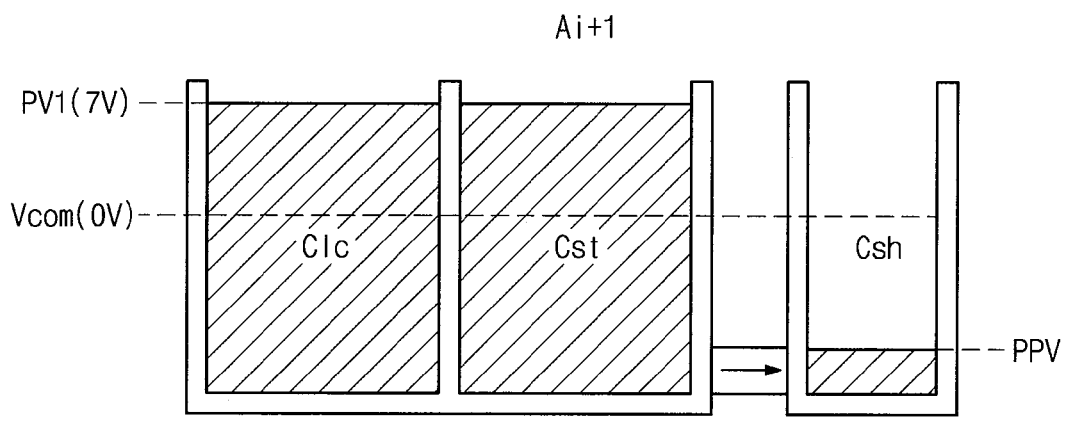
Figure 4C:
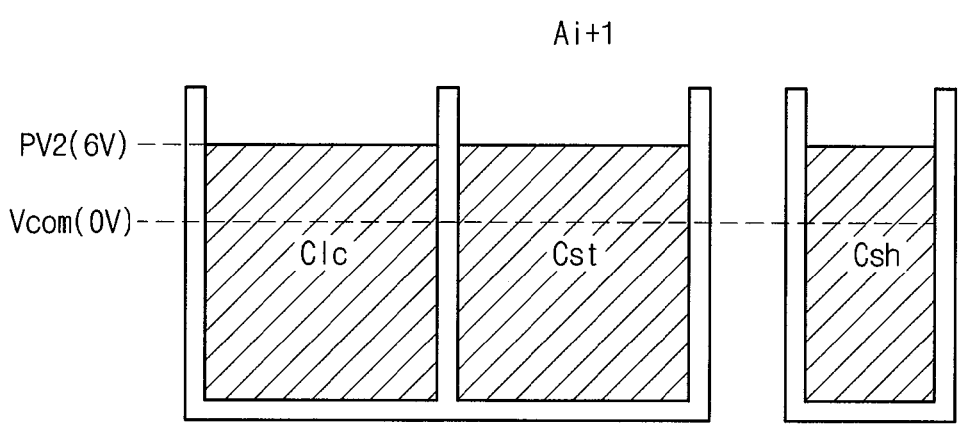

In the example of FIG. 3, the pixel color is dark in two consecutive frames in the normally white mode. FIGS. 4A to 4C are diagrams for understanding voltages variations of the liquid crystal capacitor, the storage capacitor and the sharing capacitor at different stages illustrated in FIG. 3.

In FIG. 3, immediately before the I'th active period Ai of the current frame, the pixel electrode PE and the sharing electrode SSE are at the voltage PPV obtained in the previous frame. The voltage PPV has negative polarity relative to the common voltage Vcom, and corresponds to a dark color ("B"). During the i'th is active period Ai of the current frame, i.e. during the voltage pulse on the gate line GLi, the pixel electrode PE is driven to a first pixel voltage PV1 which also corresponds to a dark color ("B", the same or different dark color relative the previous frame) but has positive polarity. The sharing electrode SSE stays at the previous pixel voltage PPV (dark color).

Next, during the i+1'st active period Ai+1 of the current frame, on the pulse of the signal GP2, the pixel electrode PE and the second sharing electrode SSE become coupled to each other. Therefore, the voltage of the pixel electrode PE decreases due to charge sharing with the sharing electrode SSE. The voltage of the sharing electrode SSE increases due to charge sharing with the pixel electrode PE. The pixel electrode PE and the sharing electrode SSE are both now at the second pixel voltage PV2, which is below the first pixel voltage PV1 by a first voltage difference V1.

As shown in FIG. 4A to FIG. 4C, during the i'th active period Ai, the liquid crystal capacitor Clc and the storage capacitor Cst are charged to the first pixel voltage PV1, for example 7V, corresponding to a dark color. The sharing capacitor Csh maintains the pixel voltage PPV (dark color) obtained in the previous frame period. The common voltage Vcom of the common electrode is assumed to be 0V.

Then, during the i+1'st active period Ai+1, the liquid crystal capacitor Clc and the storage capacitor Cst share their charge with the sharing capacitor Csh. The liquid crystal capacitor Clc, the storage capacitor Cst and the sharing capacitor Csh reach the second pixel voltage PV2, for example 6V. The first voltage difference V1 (the difference between the first and second pixel voltages PV1, PV2) is therefore 1V.

Figure 5:
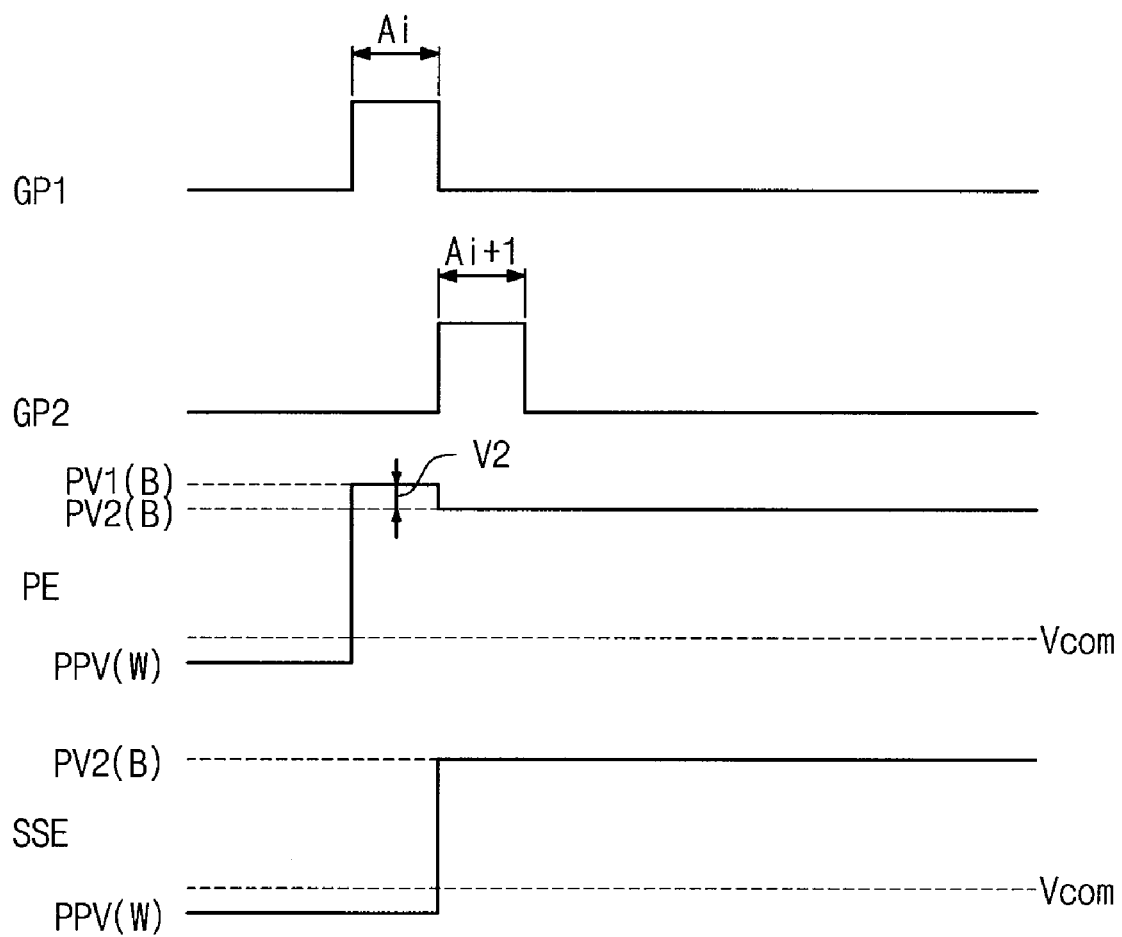
FIG. 5 shows timing diagrams for a pixel according to some embodiments of the present invention.
Figure 6A:
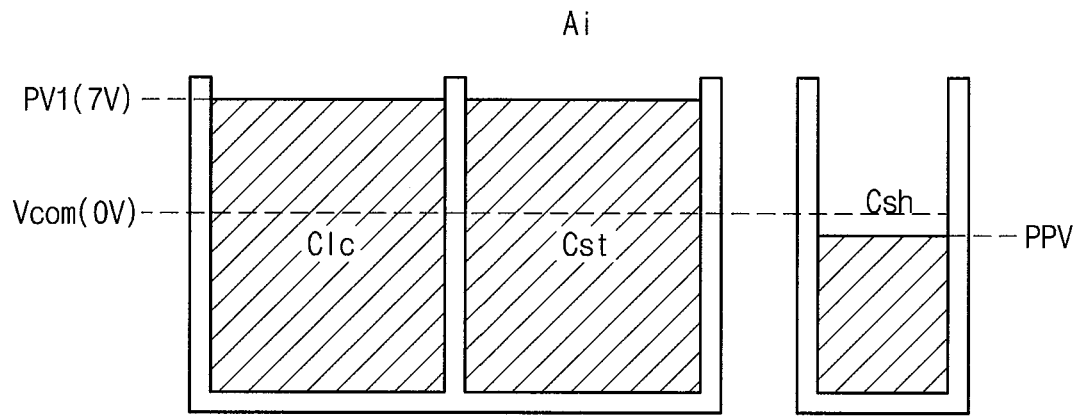
FIG. 6A to FIG. 6C are diagrams for understanding voltage variations of a liquid crystal capacitor, a storage capacitor and a sharing capacitor at different stages illustrated in FIG. 3.
Figure 6B:
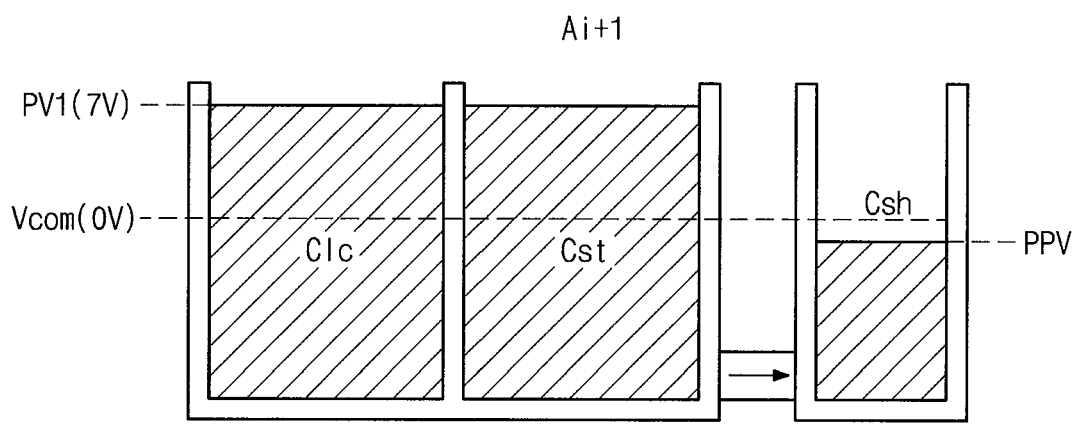
Figure 6C:
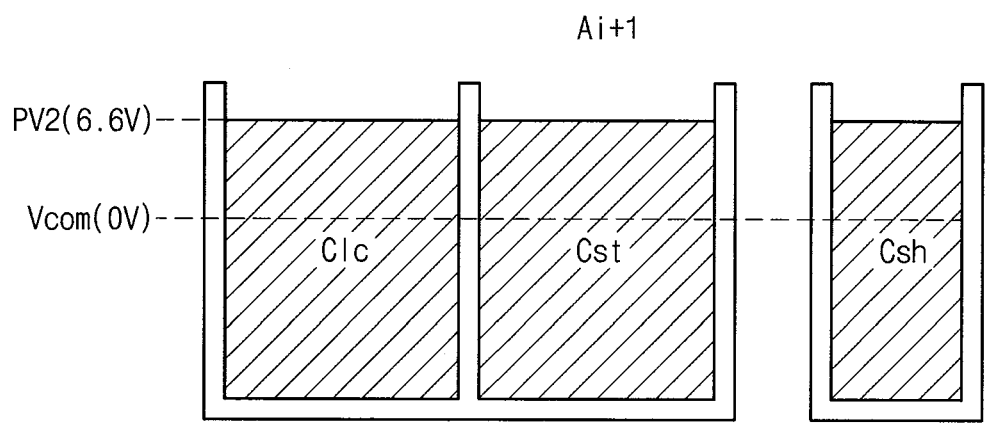

FIG. 5 shows timing diagrams for the case when the pixel's color changes from light to dark in the normally white mode. FIG. 6A to FIG. 6C are diagrams for understanding voltage variations of the liquid crystal capacitor, the storage capacitor and the sharing capacitor at different stages illustrated in FIG. 5.

In FIG. 5, immediately before the ith active period Ai of the current frame, the pixel electrode PE and the sharing electrode SSE are at a voltage PPV obtained in the previous frame. The voltage PPV has negative polarity relative to the common voltage Vcom, and corresponds to a light color ("W"). During the i'th active period Ai of the current frame, i.e. during the voltage pulse on the gate line GLi, the pixel electrode PE is driven to a first pixel voltage PV1 corresponding to a dark color ("B"), and the sharing electrode SSE stays at the previous pixel voltage PPV (light color). The first pixel voltage PV1 has positive polarity relative to the common voltage Vcom.

Next, during the i+1'st active period Ai+1 of the current frame, on the pulse of the signal GP2, the pixel electrode PE and the sharing electrode SSE are coupled to each other. Therefore, the voltage of the pixel electrode PE decreases due to charge sharing with electrode SSE. The voltage of the sharing electrode SSE increases due to charge sharing with the pixel electrode PE. As a result, the pixel electrode PE and the sharing electrode SSE are both at a second pixel voltage PV2, which is below the first pixel voltage PV1 by a second voltage difference V2.

As shown in FIGS. 6A to 6C, during the i'th active period Ai the liquid crystal capacitor Clc and the storage capacitor Cst are charged to the first pixel voltage PV1, for example 7V, corresponding to a dark color. The sharing capacitor Csh maintains the previous pixel voltage PPV (light color) obtained in the previous frame period. The common voltage Vcom of the common electrode is assumed to be 0V.

Then, during the i+1'st active period Ai+1, the liquid crystal capacitor Clc and the storage capacitor Cst share their charge with the sharing capacitor Csh. The liquid crystal capacitor Clc, the storage capacitor Cst and the sharing capacitor Csh reach the second pixel voltage PV2, for example 6.6V. The second voltage difference V2 (the difference between the first and second pixel voltages PV1, PV2) is therefore 0.4V.

In the examples described immediately above, when a pixel changes from light (W) to dark (B), the pixel electrode's second pixel voltage PV2 is 6.6V, and when a pixel is dark in two consecutive frames, the pixel electrode's second pixel voltage PV2 is 6.0V. Thus, the absolute value of the voltage PV2 is bigger on light-to-dark transitions, providing a bigger voltage overshoot to compensate the dynamic capacitance of the liquid crystal capacitor and speed up the liquid crystal response.

As seen from the above, the pixel electrode's voltage PV2 is automatically taken into account the previous frame's voltage to increase the response speed of the liquid crystal on greater changes of the pixel color.

Figure 7:
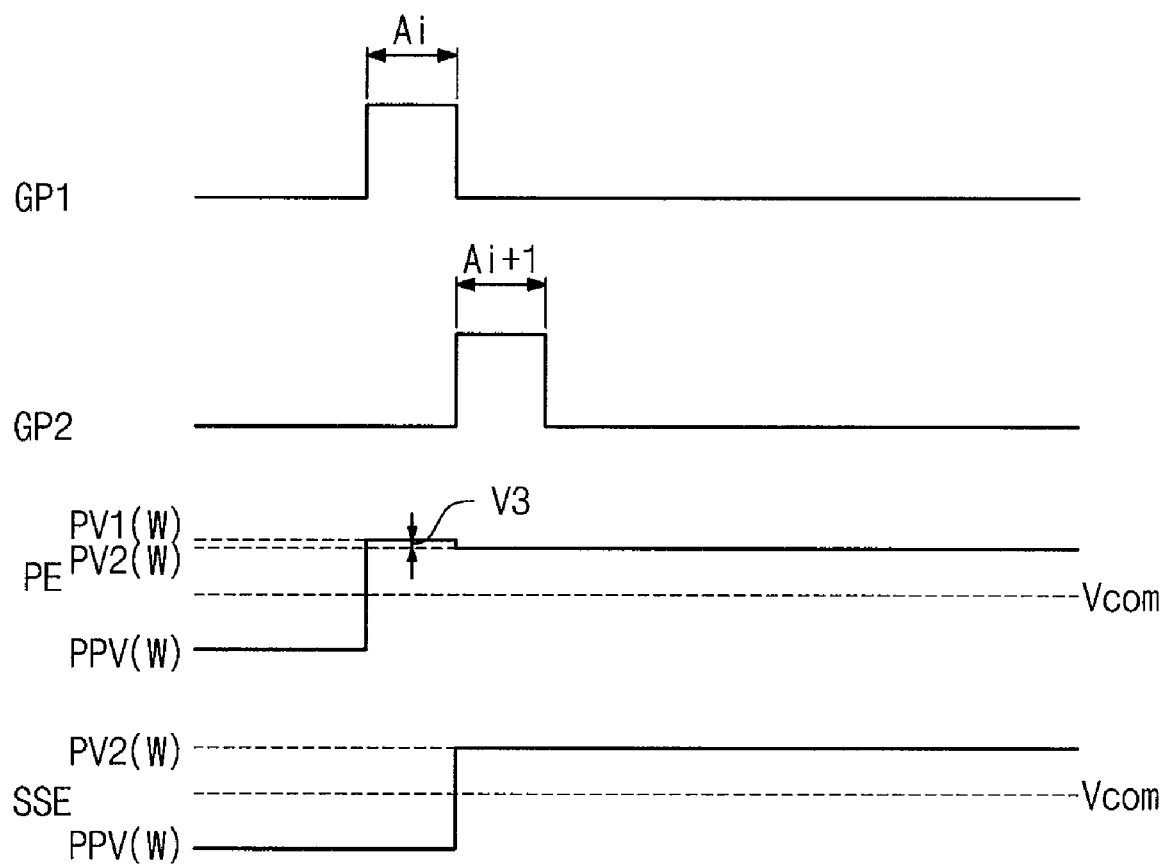
FIG. 7 shows timing diagrams for a pixel according to some embodiments of the present invention.
Figure 8A:
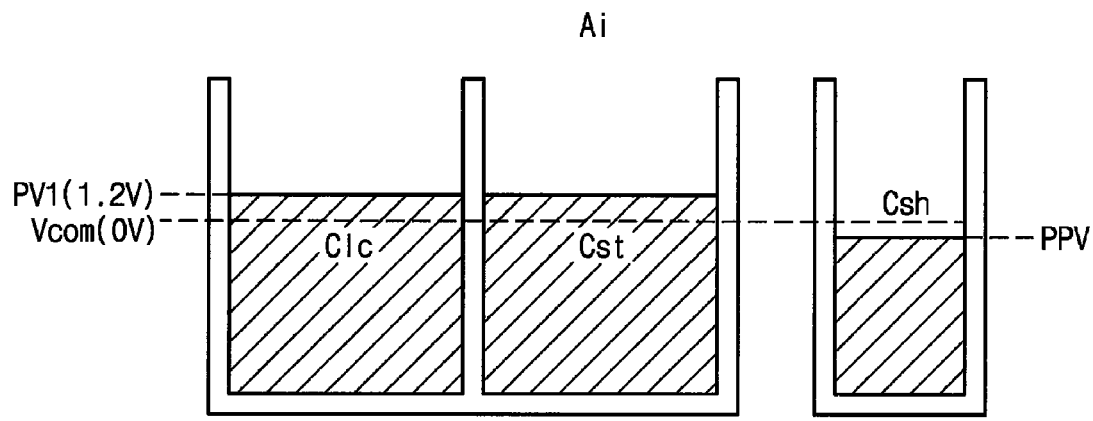
FIG. 8A to FIG. 8C are diagrams for understanding voltage variations of a liquid crystal capacitor, a storage capacitor and a sharing capacitor at different stages illustrated in FIG. 3.
Figure 8B:
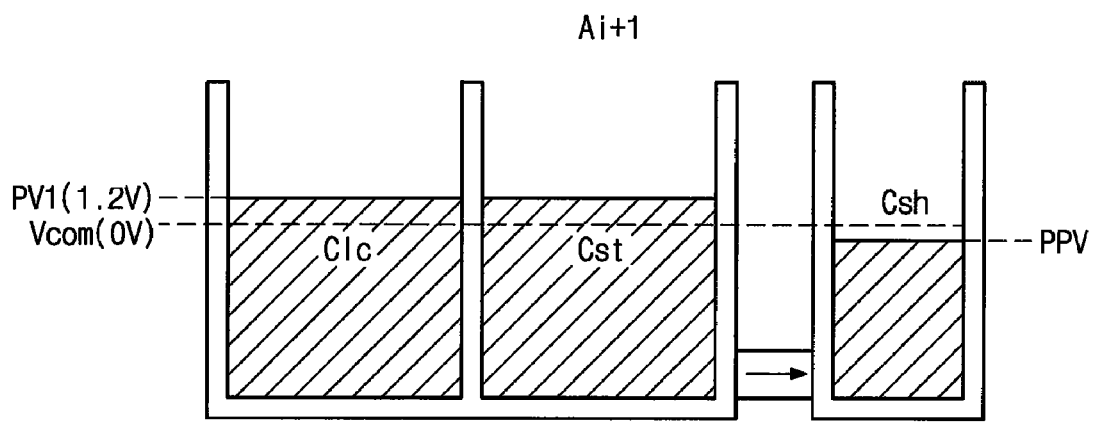
Figure 8C:
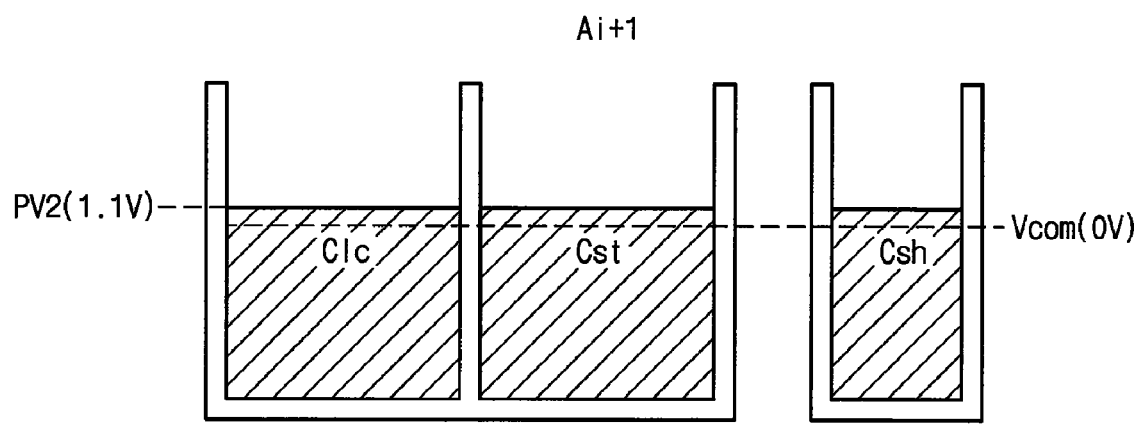

FIG. 7 shows timing diagrams for the case when a pixel's color is light in two consecutive frames. FIGS. 8A to 8C are diagrams for understanding voltage variations of the liquid crystal capacitor, the storage capacitor and the sharing capacitor at different stages illustrated in FIG. 7.

In FIG. 7, immediately before the I'th active period Ai of the current frame, the pixel electrode PE and the sharing electrode SSE are at a voltage PPV (light color) obtained in the previous frame. The voltage PPV has negative polarity relative to the common voltage Vcom. During the i'th active period Ai of the current frame, i.e. during the voltage pulse on the gate line GLi, the pixel electrode PE is driven to a first pixel voltage PV1 (light color), and the sharing electrode SSE stays at the previous pixel voltage PPV (light color). The first pixel voltage PV1 has positive polarity relative to the common voltage Vcom.

Next, during the i+1'st active period Ai+1 of the current frame, on the pulse of the signal GP2, the pixel electrode PE and the sharing electrode SSE are coupled to each other. Therefore, the voltage of the pixel electrode PE decreases due to charge sharing with the sharing electrode SSE, and the voltage of the sharing electrode SSE increases due to charge sharing with the pixel electrode PE. As a result, the pixel electrode PE and the sharing electrode SSE reach a second pixel voltage PV2, which is below the first pixel voltage PV1 by a third voltage difference V3.

As shown in FIGS. 8A to 8C, during the i'th active period Ai the liquid crystal capacitor Clc and the storage capacitor Cst are charged to the first pixel voltage PV1, for example 1.2V, corresponding to a light color. The sharing capacitor Csh maintains the previous pixel voltage PPV (light color) obtained during the previous frame period. The common voltage Vcom of the common electrode is assumed to be 0V.

Then, during the i+1'st active period Ai+1, the liquid crystal capacitor Clc and the storage capacitor Cst share their charge with the sharing capacitor Csh. The liquid crystal capacitor Clc, the storage capacitor Cst and the sharing capacitor Csh reach the second pixel voltage PV2, for example 1.1V. The third voltage difference V3 (the difference between the first and second pixel voltages PV1, PV2) is therefore 0.1V.

Figure 9:
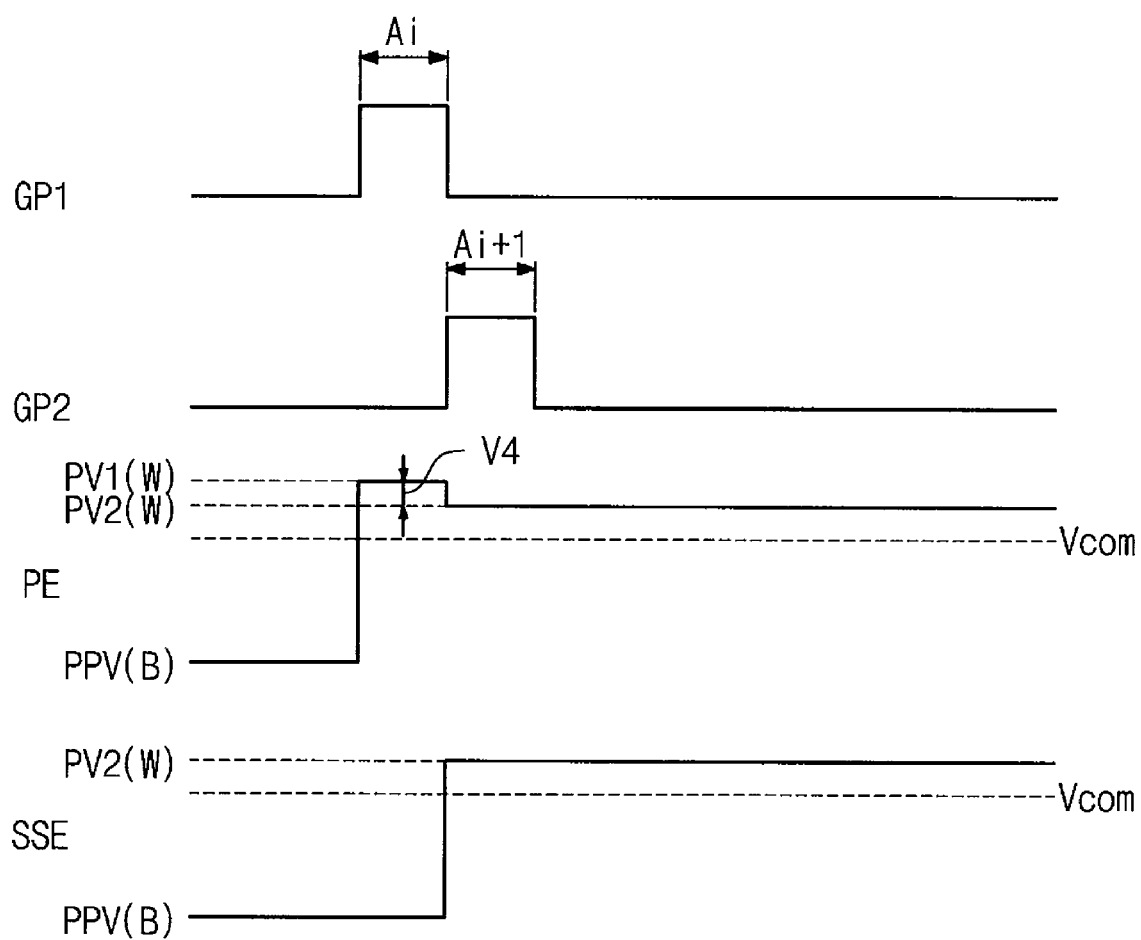
FIG. 9 shows timing diagrams for a pixel according to some embodiments of the present invention.
Figure 10A:
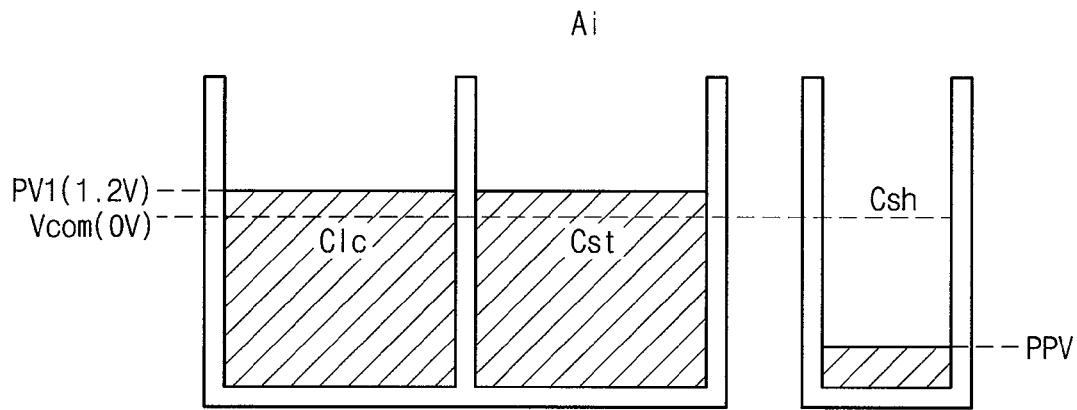
FIG. 10A to FIG. 10C are diagrams for understanding voltage variations of a liquid crystal capacitor, a storage capacitor and a sharing capacitor at different stages illustrated in FIG. 3.
Figure 10B:
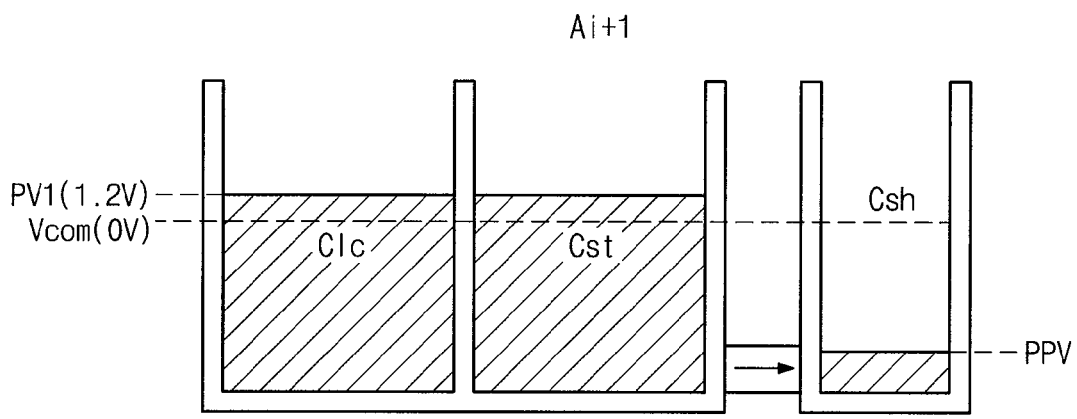
Figure 10C:
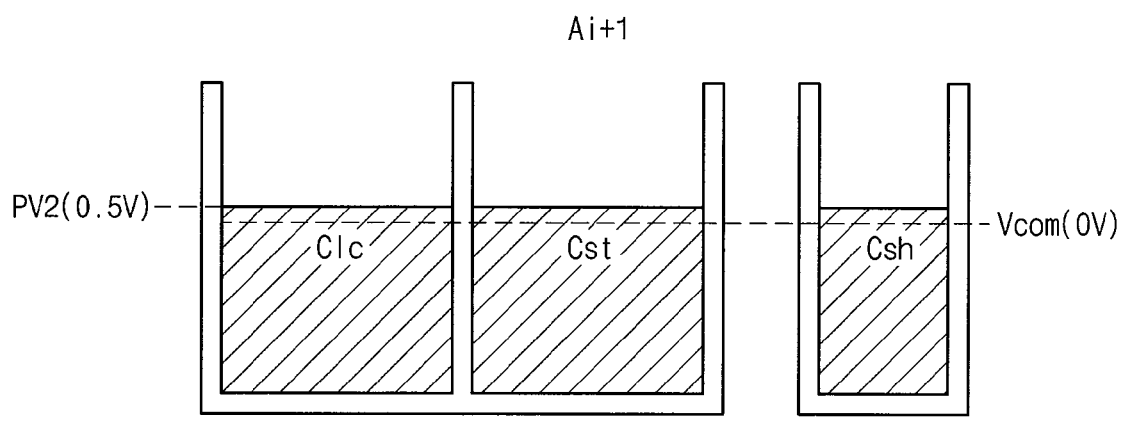

FIG. 9 shows timing diagrams for the case when a pixel's color changes from a dark color to a light color in the normally white mode. FIGS. 10A to 10C are diagrams for understanding voltage variation of the liquid crystal capacitor, the storage capacitor and the sharing capacitor at different stages illustrated in FIG. 9.

In FIG. 9, immediately before the ith active period Ai of the current frame, the pixel electrode PE and the second sharing electrode SSE are at a voltage PPV (dark color) obtained in the previous frame. The voltage PPV has negative polarity relative to the common voltage Vcom. During the i'th active period Ai of the current frame, i.e. during the voltage pulse on the gate line GLi, the pixel electrode PE is driven to a first pixel voltage PV1 (light color), and the second sharing electrode SSE stays at the previous pixel voltage PPV (light color). The first pixel voltage PV1 has positive polarity relative to the common voltage Vcom.

Next, during the i+1'st active period Ai+1 of the current frame, on the pulse of the signal GP2, the pixel electrode PE and the second sharing electrode SSE are coupled to each other. Therefore, the voltage of the pixel electrode PE decreases due to charge sharing with the sharing electrode SSE, and the voltage of the sharing electrode SSE increases due to charge sharing with the pixel electrode PE. As a result, the pixel electrode PE and the sharing electrode SSE are both at a second pixel voltage PV2, which is below the first pixel voltage PV1 by a fourth voltage difference V4.

As shown In FIGS. 10A to 10C, during the i'th active period Ai the liquid crystal capacitor Clc and the storage capacitor Cst are charged to the first pixel voltage PV1 (light color), for example 1.2V. The sharing capacitor Csh maintains the previous pixel voltage PPV (dark color) obtained during the previous frame period. The common voltage Vcom of the common electrode is assumed to be 0V.

Then, during the i+1'st active period Ai+1, the liquid crystal capacitor Clc and the storage capacitor Cst share their charge with the sharing capacitor Csh. The liquid crystal capacitor Clc, the storage capacitor Cst and the sharing capacitor Csh reach the second pixel voltage PV2, for example 0.5V. The fourth voltage difference V4 (the difference between the first and second pixel voltages PV1, PV2) is therefore 0.7V.

In these examples, when a pixel's color is light in two consecutive frames, the second pixel voltage PV2 of the pixel electrode is 1.1V, and when a pixel changes from dark to light, the second pixel voltage PV2 of the pixel electrode is 0.5V. Thus, the absolute value of the voltage PV2 is smaller on dark-to-light transitions, providing a bigger voltage undershoot to compensate the dynamic capacitance of the liquid crystal capacitance and speed up the liquid crystal response from a state corresponding to a high voltage to a state corresponding to a low voltage.

Thus, the pixel electrode' voltage PV2 is adjusted based on the desired color transitions to save power and/or increase the liquid crystal response speed.

FIGS. 3 to 10C illustrate how the liquid crystal capacitor Clc, the storage capacitor Cst and the sharing capacitor Csh change their voltages depending on the pixel color in the liquid crystal display device in the normally white mode.

Clearly, similar illustration can be obtained for the normally black mode. The voltages of the liquid crystal capacitor Clc, the storage capacitor Cst and the sharing capacitor Csh will also depend on the pixel color in two consecutive frames so as to provide an overshoot or an undershoot when needed to improve the response speed.

Figure 11:
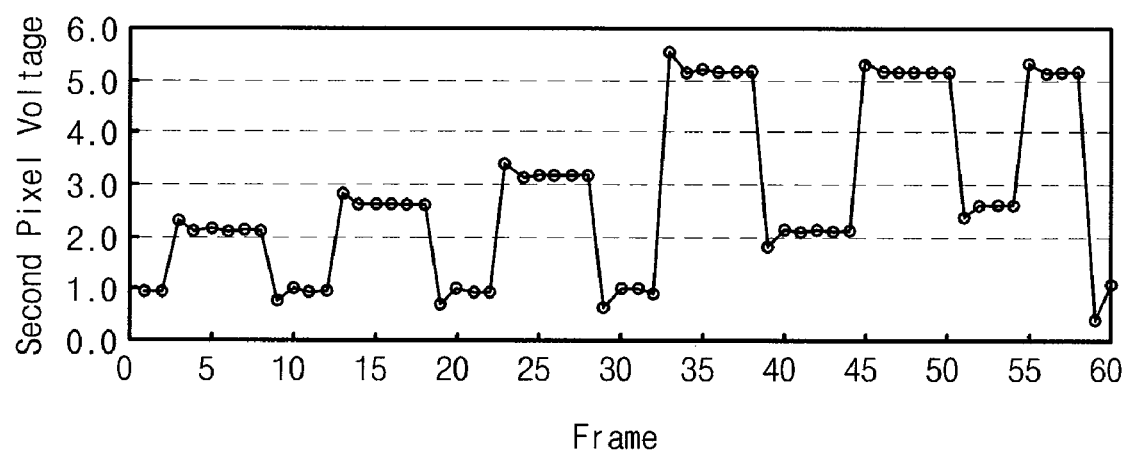
FIG. 11 is a graph of a pixel voltage magnitude over a sequence of frames in some embodiments of the present invention.

FIG. 11 is a graph showing possible magnitude values of the second pixel voltage PV2 for a number of consecutive frames. The X axis indicates the frame number (the frames are numbered consecutively), and the Y axis indicates the magnitude of the second pixel voltage for a given pixel. The magnitude of the second pixel voltage is shown for 60 consecutive frames for different pixel colors and color transitions. The liquid crystal display is assumed to operate in the patterned vertical alignment (PVA) and normally black mode, and the capacitance ratio of the liquid crystal capacitor Clc versus storage capacitor Cst versus sharing capacitor Csh is assumed to be 1:0.75:0.3.

As shown in FIG. 11, when the pixel color changes from dark to light, the second pixel voltage PV2 overshoots, and when the pixel color changes from light to dark, the second pixel voltage undershoots. The overshoot and undershoot depend on the color transition to increase the response speed of the liquid crystal when changing from light to dark or from dark to light. The sharing capacitor provides a simple way to take into account the pixel electrode voltage in the previous frame without using more complex memory devices.

Figure 12:
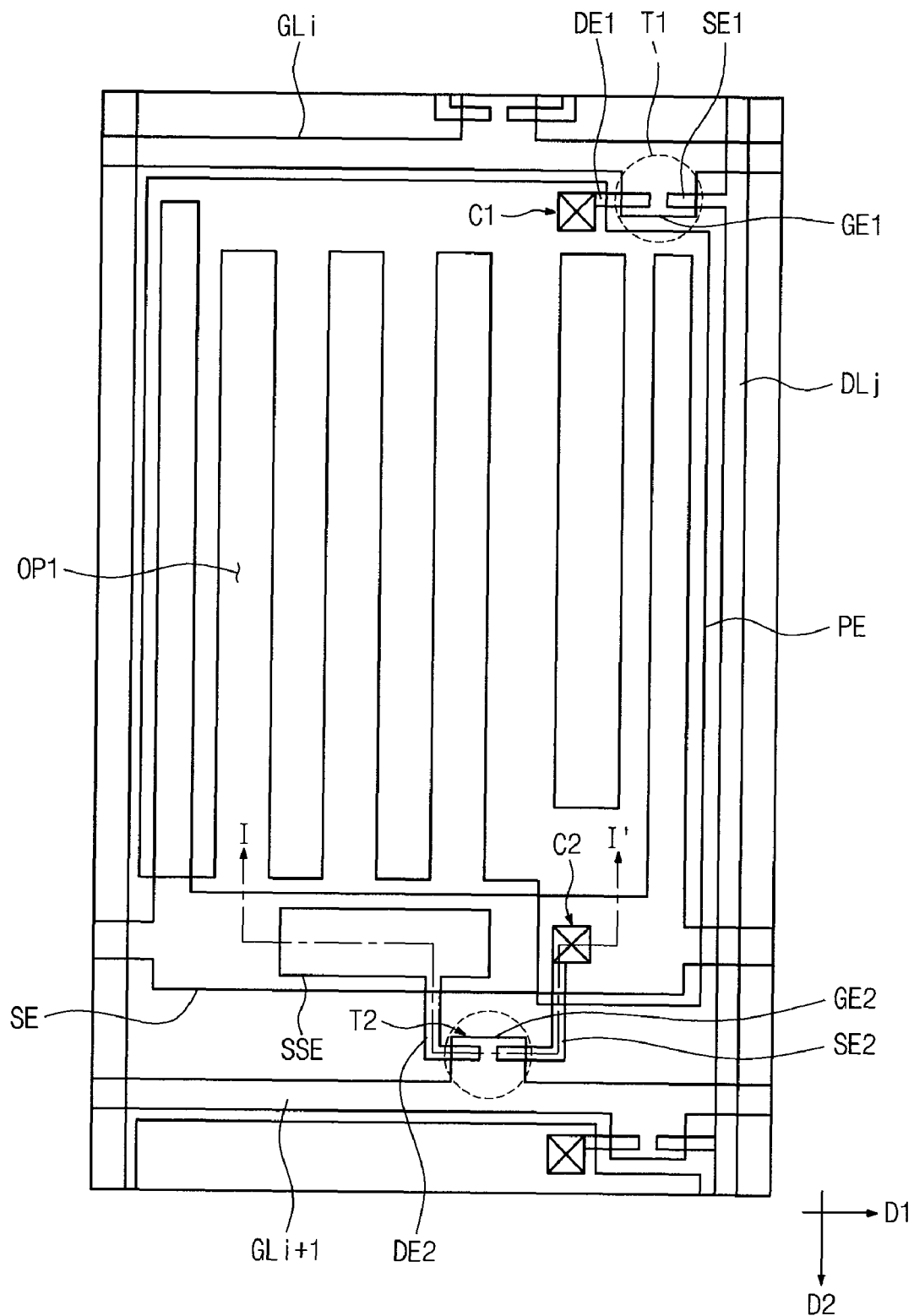
FIG. 12 is a lay-out view of a pixel according to one embodiment of this invention.
Figure 13:
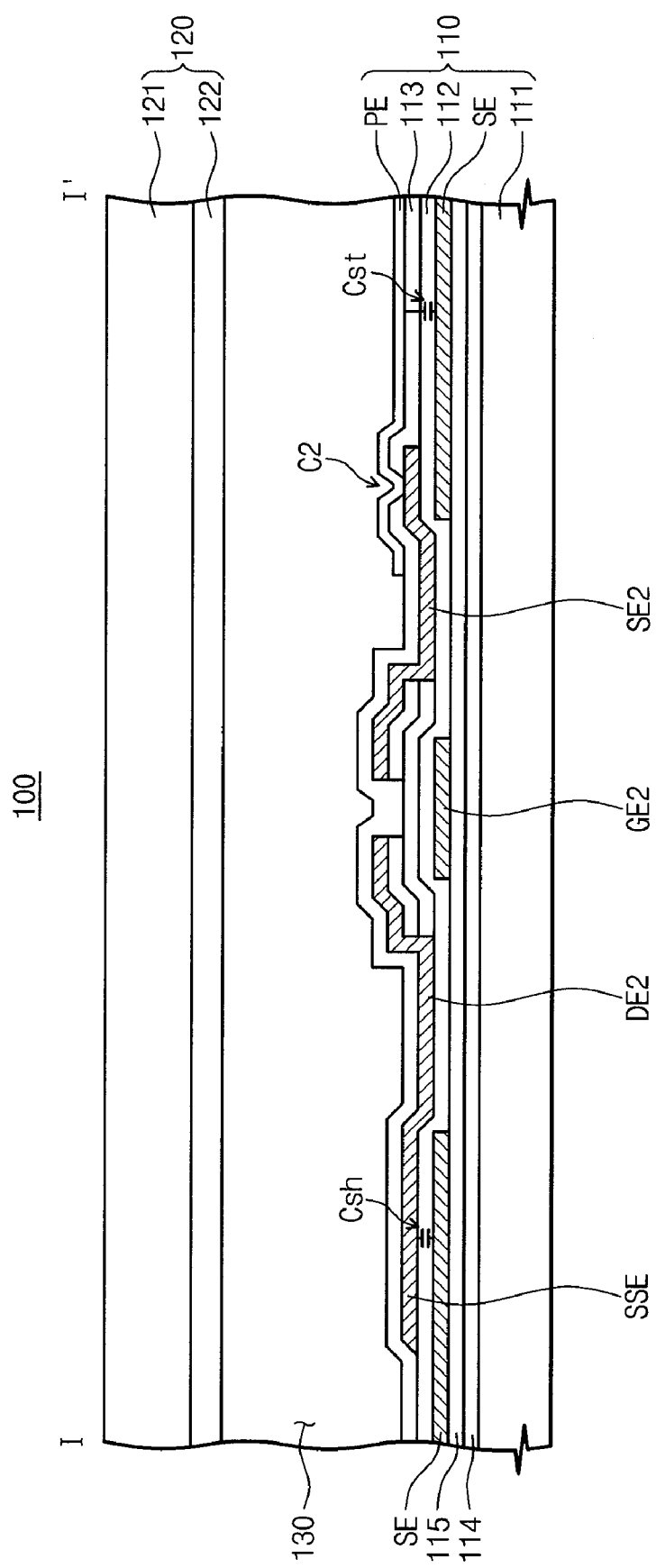
FIG. 13 shows a vertical cross section along the line I-I' shown in FIG. 12.

FIG. 12 is a layout view of a pixel (i,j) according to one embodiment of this invention. FIG. 13 shows the vertical cross section along the line I-I' shown in FIG. 12.

In FIG. 12 and FIG. 13, an array panel 100 operated in a plane to line switching (PLS) mode includes a lower panel 110, an upper panel 120 facing the lower panel 110, and a liquid crystal layer 130 interposed between the lower panel 110 and the upper panel 120. The lower panel 110 includes a first base substrate 111, a common electrodes 114, gate lines GL1~GLn (lines GLi, GLi+1 are shown), data lines DL1~DLm (data line DLj is shown), first thin film transistors T1, second thin film transistors T2, pixel electrodes PE, sharing electrodes SSE and storage electrodes SE.

The common electrode 114 is arranged on the first base substrate 111 and receives a common voltage. The common electrode 114 includes A transparent conductive material such as indium tin oxide (ITO) or indium zinc oxide (IZO). The common electrode 114 is covered by an insulating layer 115.

Specifically, a metal layer ("gate metal") is deposited on the insulating layer 115 and patterned to form the gate lines GL1~GLn, the first gate electrodes GE1 of the first thin film transistors Ti, the second gate electrodes GE2 of the second thin film transistors T2, and the storage electrodes SE.

The gate lines GL1~GLn extend in the first direction D1 at a prescribed distance from each other. In each pixel (i,j), the first gate electrode GE1 branches off from the gate line GLi, and the second gate electrode GE2 branches off from the i+1'st gate line GLi+1. The storage electrode SE is formed between the i'th gate line GLi and the i+1'st gate line GLi+1.

Gate dielectric film 112 is formed on the gate lines GL1~GLn, the first gate electrodes GE1 and the second gate electrodes GE2.

Another metal layer ("data metal") is deposited on the gate dielectric film 112 and patterned to provide the data lines DL1~DLm, the first source electrodes SE1 and the first drain electrodes DE1 of the first thin film transistors T1, the second source electrodes SE2 and the second drain electrodes DE2 of the second thin film transistors T2, and the sharing electrodes SSE.

The data lines DL1~DLm extend in the second direction D2. In each pixel (i,j), the first source electrode SE1 branches off from the j'th data line DLj and overlaps with the first gate electrode GE1. The first drain electrode DE1 is spaced from the first source electrode SE1 and overlaps with the first gate electrode GE1. The second drain electrode DE2 and the second source electrode SE2 are spaced apart by a prescribed distance.

The sharing electrode SSE forms an extension of the second drain electrode DE2 in the data metal layer. The sharing electrode SSE is directly above the storage electrode SE with the gate dielectric film 112 interposed therebetween. The sharing capacitor Csh is formed as a sandwich including the gate dielectric film 112 interposed between the storage electrode SE and the sharing electrode SSE. The capacitance of the sharing capacitor Csh is defined by the area of overlap between the sharing electrode SSE and the storage electrode SE.

An overcoat layer 113 is formed over the gate dielectric film 112 to cover the data lines DL, the first source electrodes SE1, the second source electrodes SE2, the first drain electrodes DE1, the second drain electrodes DE2 and the sharing electrodes SSE.

The overcoat layer 113 is patterned to form first contact holes C1 and second contact holes C2. For each pixel, the corresponding first contact hole C1 exposes the pixel's first drain electrode DE1, and the corresponding second contact hole C2 exposes the second source electrode SE2.

A transparent conductive material such as indium tin oxide (ITO) or indium zinc oxide (IZO) is formed over the overcoat layer 113 to provide the pixel electrodes PE. In each pixel, the pixel electrode PE is coupled to the first drain electrode DE1 through the first contact hole C1 and to the second source electrode SE2 through the second contact hole C2. The pixel electrode PE overlaps with the storage electrode SE. The overcoat layer 113 and the gate dielectric film 112 are interposed between the pixel electrode PE and the storage electrode SE. The storage capacitor Cst is defined by the pixel electrode PE, the overcoat layer 113, the gate dielectric film 112 and the storage electrode SE. Also, openings OP1 are provided through the pixel electrode PE to expose the overcoat layer 113, the pixel electrode PE faces to the common electrode 114 arranged on the first base substrate 111. Therefore, in each pixel, the liquid crystal capacitor (not shown) is defined by the common electrode 114, the liquid crystal layer 130 and the pixel electrode PE.

The upper panel 120 includes a second base substrate 121, and a color filter layer 122. The color filter layer 122 is arranged on the second base substrate 121. The color filter layer 122 includes red, green and blue pigments.

Figure 14:
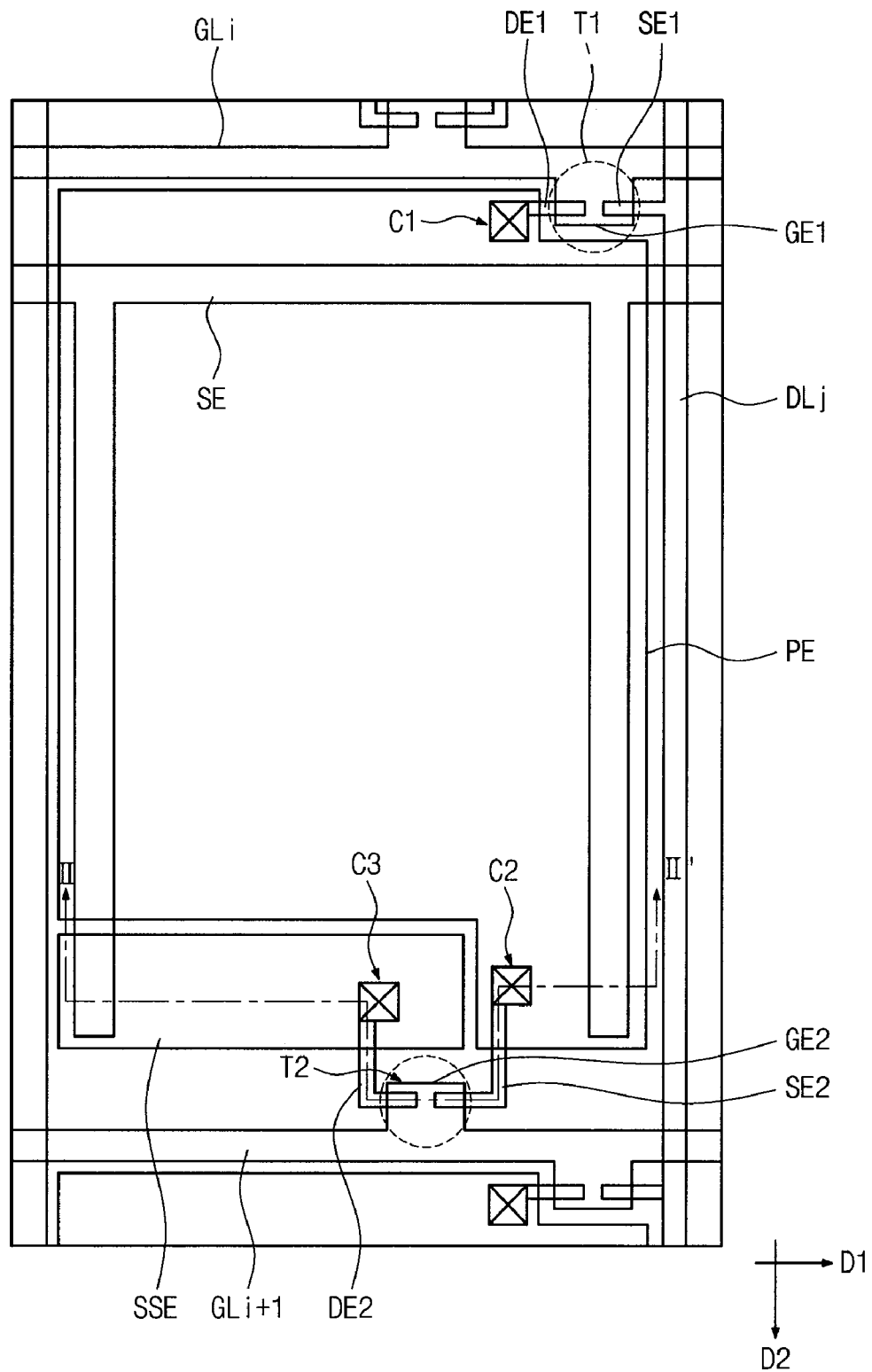
FIG. 14 is a layout view of a pixel according to another embodiment of this invention.
Figure 15:
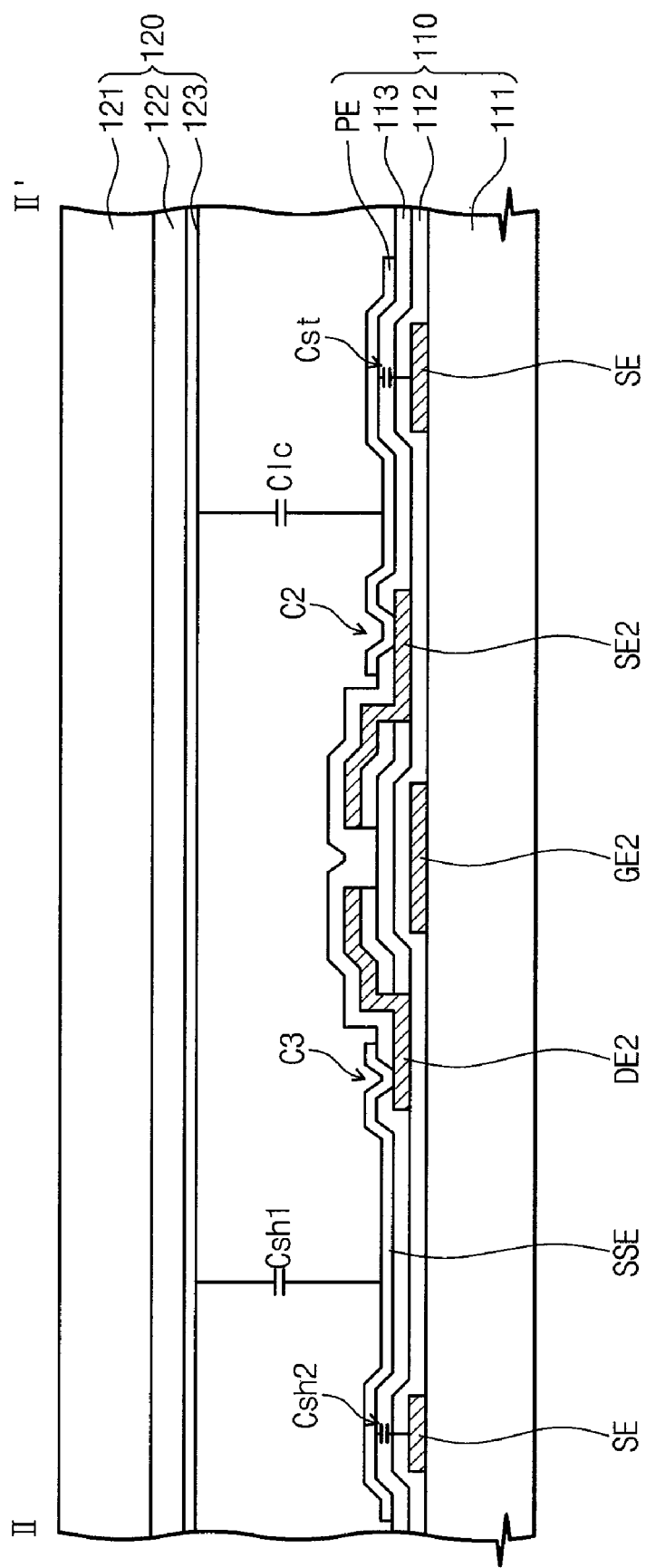
FIG. 15 shows a vertical cross section along the line II-II' shown in FIG. 14.
Figure 16:
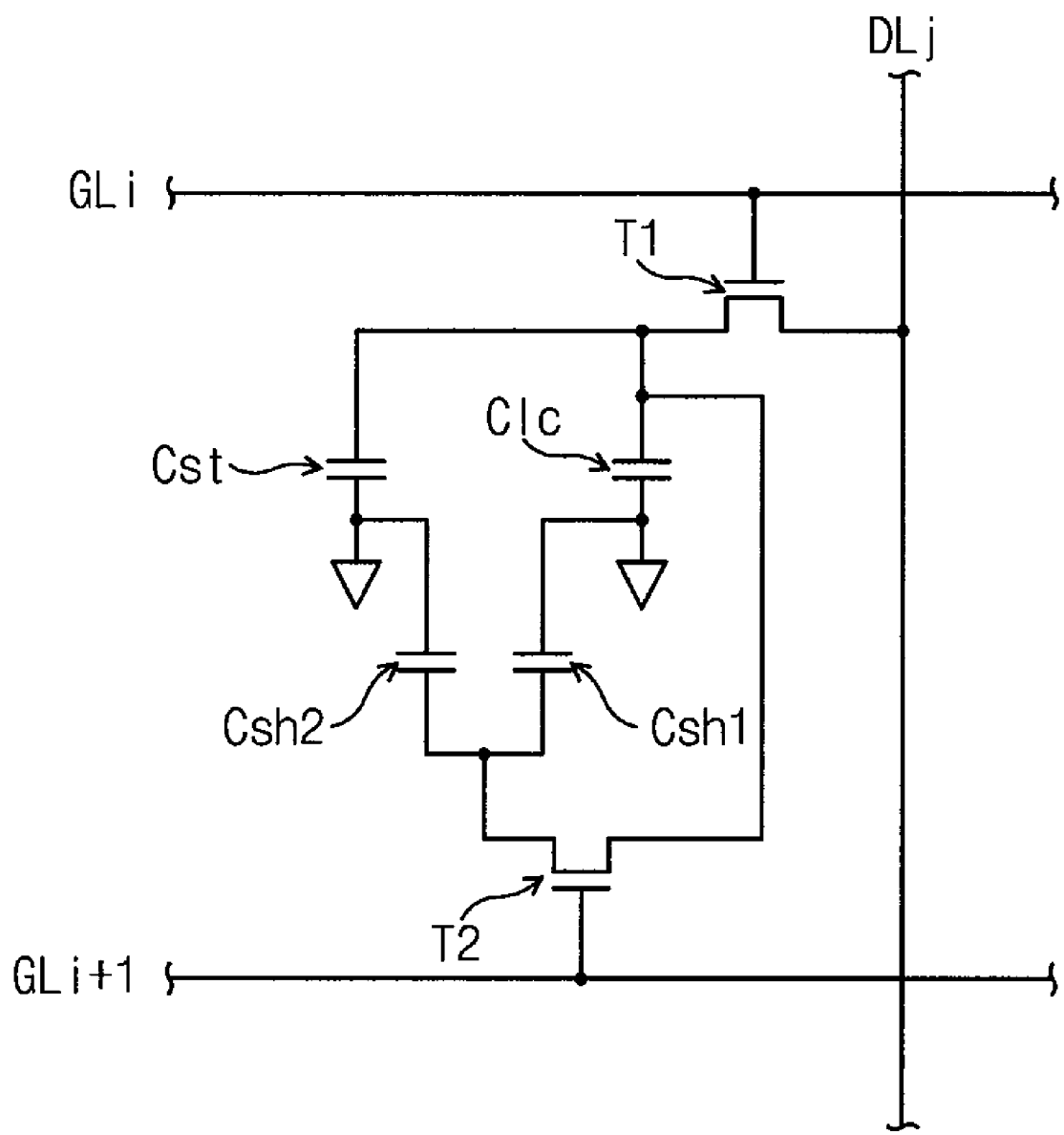
FIG. 16 is a circuit diagram of a pixel of the liquid crystal display shown in FIG. 14.

In embodiments illustrated in FIGS. 14 to 20, the sharing electrodes SSE and the pixel electrodes PE are made of the same metal layer. FIG. 14 is a layout view of a pixel (i,j) according to this embodiment, and FIG. 15 shows the vertical cross section along the line II-II' shown in FIG. 14. FIG. 16 is a circuit diagram of the pixel (i,j). In FIGS. 14 to 16, a first sharing capacitor Csh1 is formed using the liquid crystal layer, and a second sharing capacitor Csh2 is formed using another insulator. Lower panel 110 includes first base substrate 111, gate lines GL1~GLn, data lines DL1~DLm, first thin film transistors T1, second thin film transistors T2, pixel electrodes PE, sharing electrodes SSE and storage electrodes SE.

A gate metal layer is deposited on the first base substrate 111 and patterned to provide gate lines GL1~GLn, first gate electrodes GE1 of the first thin film transistors T1, second gate electrodes GE2 of the second thin film transistors T2, and the storage electrodes SE.

In each pixel (i,j), the first gate electrode GE1 branches off from the i'th gate line GLi, and the second gate electrode GE2 branches off from the i+1'st gate line GLi+1. The storage electrode SE is formed between the i'th gate line GLi and the i+1'st gate line GLi+1.

Gate dielectric film 112 covers the gate lines GL1~GLn, the first gate electrodes GE1 and the second gate electrodes GE2. A data metal layer is deposited on the gate dielectric film 112 and patterned to form data lines DL1~DLm, first source electrodes SE1 and first drain electrodes DE1 of the first thin film transistors T1, second source and drain electrode SE2, DE2 of the second thin film transistors T2, and sharing electrodes SSE.

In each pixel (i,j), the first source electrode SE1 branches off from the j'th data line DLj and overlaps with the first gate electrode GE1. The first drain electrode DE1 is spaced from the first source electrode SE1 and also overlaps the first gate electrode GE1. The second drain electrode DE2 and the second source electrode SE1 are separated by a region having prescribed dimensions and overlying the second gate electrode GE2.

An overcoat layer 113 is provided to cover the data lines DL1~DLm, the first source electrodes SE1, the second source electrodes SE2, the first drain electrodes DE1, the second drain electrodes DE2 and the sharing electrodes SSE. These electrodes overlie the gate dielectric film 112.

The overcoat layer 113 is patterned to form first contact holes C1 exposing the respective first drain electrodes DE1, second contact holes C2 exposing the respective second source electrodes SE2, and third contact holes C3 exposing the respective second drain electrodes SE2.

Pixel electrodes PE are formed of a transparent conductive material over the overcoat layer 113. Each pixel electrode PE is coupled to the corresponding first drain electrode DE1 through the corresponding first contact hole C1 and to the corresponding second source electrode SE2 through the corresponding second contact hole C2.

The sharing electrodes SSE are formed over the overcoat 113 from the same layer as the pixel electrodes PE and are coupled to the respective second drain electrodes DE2 through the respective third contact holes C3 made in the overcoat layer 113.

The sharing electrodes SSE underlie the upper panel 120, and in each pixel the first sharing capacitor Csh1 is formed by the sharing electrode SSE, the common electrode 123 and the liquid crystal layer therebetween. Also, the sharing electrode SSE of each pixel partially overlaps with the corresponding storage electrode SE. Accordingly, in each pixel, the second sharing capacitor Csh2 is formed by the sharing electrode SSE, the storage electrode SE, and the intervening portions of the gate dielectric layer 112 and the overcoat layer 113.

Thus, the second thin film transistor T2 can be coupled to the first and second sharing capacitors Csh1, Csh2 by forming the sharing electrode SSE of the same layer as the pixel electrode PE and by overlapping the sharing electrode SSE with the sharing electrode SE.

Figure 17:
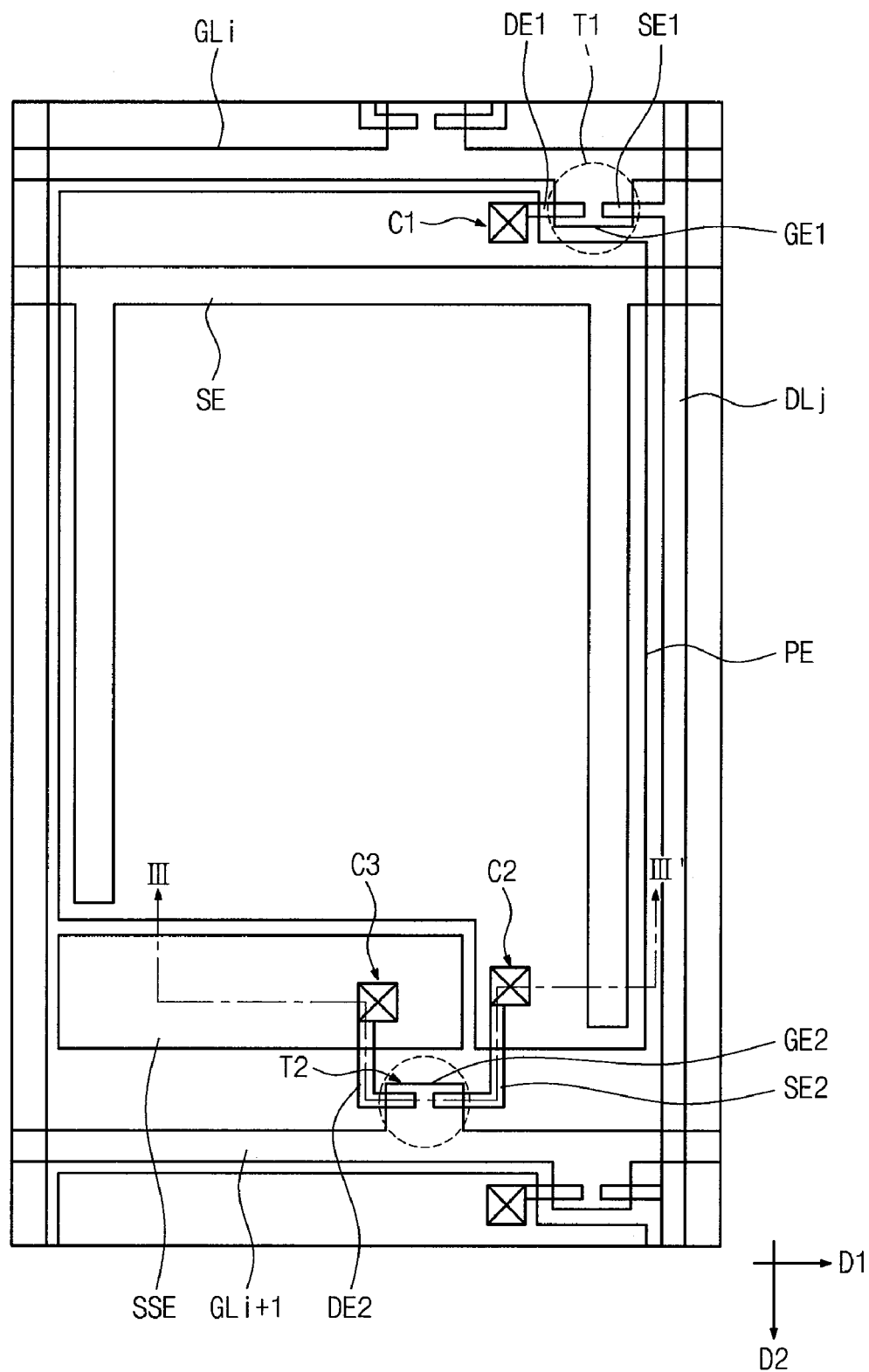
FIG. 17 is a layout view of a pixel according to some embodiments of this invention.
Figure 18:
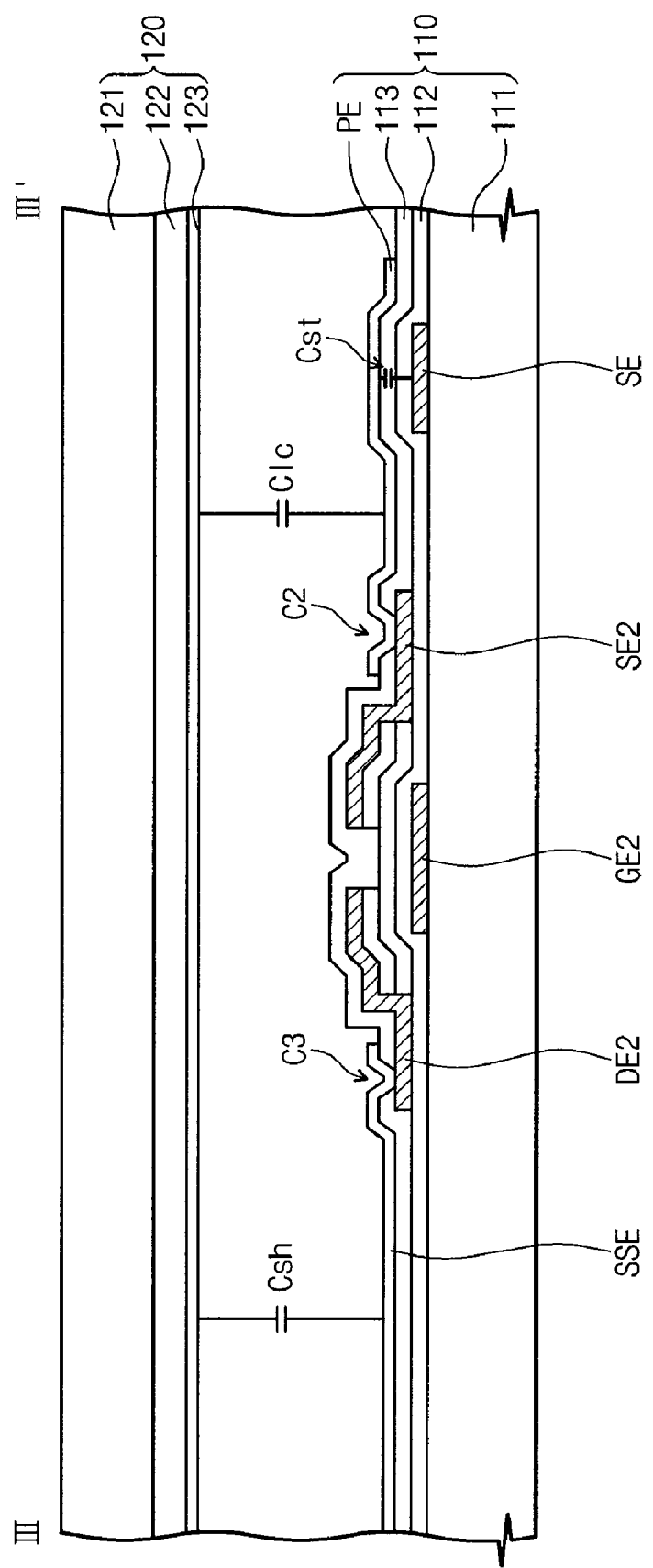
FIG. 18 shows a vertical cross section along the line Ill-Ill' shown in FIG. 17.
Figure 19:
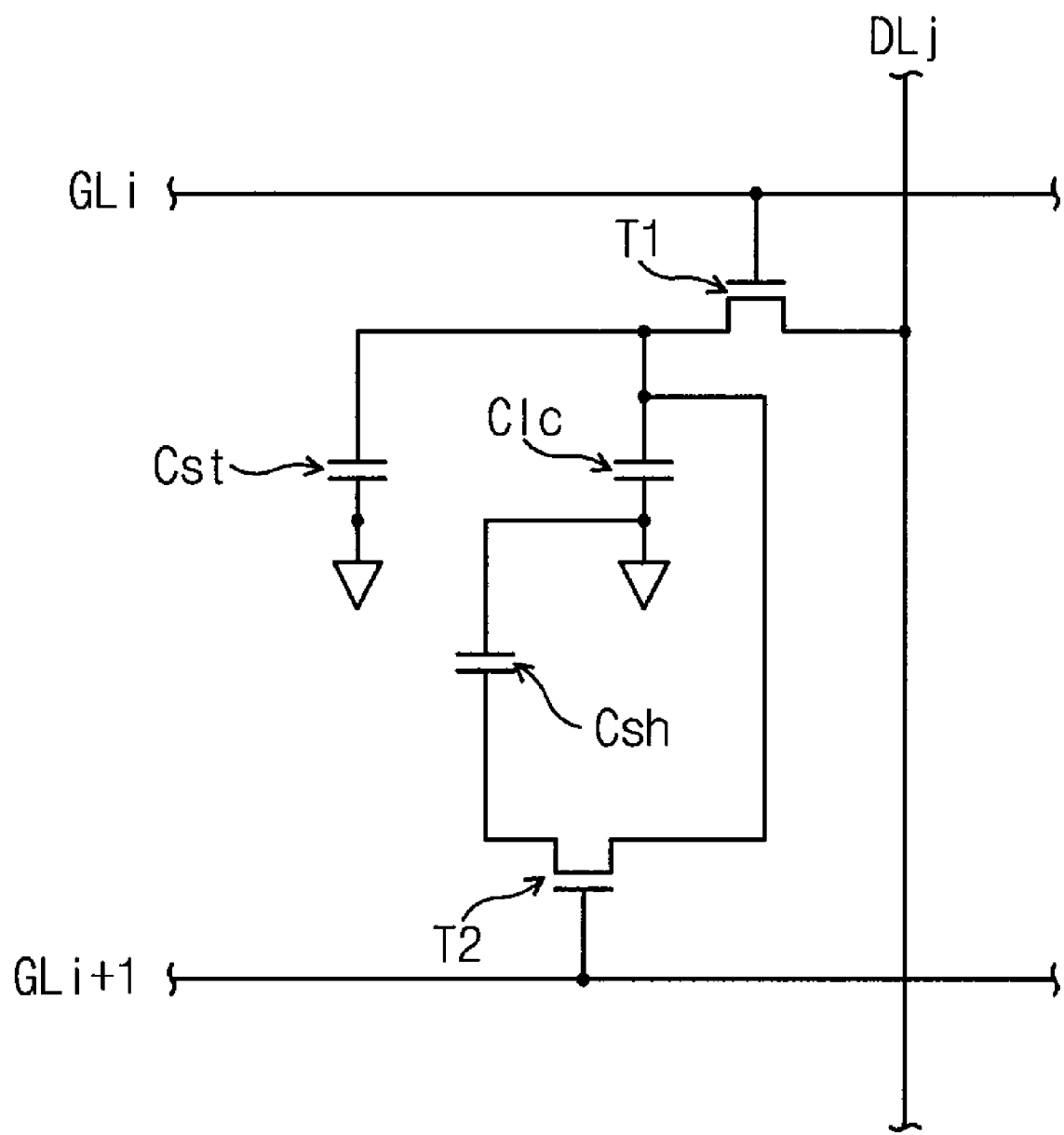
FIG. 19 is a circuit diagram of a pixel of the liquid crystal display shown in FIG. 17.

FIGS. 17 to 19 illustrate an embodiment in which the sharing capacitor Csh is formed using only the liquid crystal layer as dielectric. FIG. 17 is a layout drawing of a pixel (i,j). FIG. 18 shows the vertical cross section along the line II-II' of FIG. 17. FIG. 19 is a circuit diagram of the pixel (i,j).

Referring to FIG. 17 to FIG. 19, the sharing electrode SSE of each pixel is formed over overcoat layer 113 from the same layer as the pixel electrodes PE and is coupled to the corresponding second drain electrode DE2 of the second thin film transistor T2 through a respective third contact hole C3 in the overcoat layer 113.

The sharing electrodes SSE underlie the upper panel 120, and each first sharing capacitor Csh is defined by the corresponding sharing electrode SSE, the common electrode 123 and the intervening portion of the liquid crystal layer.

The sharing electrode SSE is not overlapped with the storage electrode SE as in FIG. 15. Thus, the sharing capacitor Csh can be formed by using the liquid crystal layer as dielectric.

The sharing capacitor structures of FIGS. 14-19 are suitable for different types of liquid crystal displays including, for example, TN (Twist Nematic) displays. The sharing capacitors of FIGS. 14-19 can also be used in PLS (Plane to Line Switching) displays described in U.S. Pat. No. 6,577,368 which is incorporated herein by reference. However, it is believed that the sharing capacitor structure of FIGS. 17-19 (with a single sharing capacitor) may be more appropriate for the PLS displays that includes the storage capacitor Cs having a capacitance greater than that of the liquid crystal capacitor Clc.

The sharing capacitor structures of FIGS. 14-19 are also appropriate for IPS (In Plan Switching), DFS (Field Switching), PVA (Patterned Vertical Alignment), SPVA (Super Patterned Vertical Alignment), MVA (multi-domain vertical alignment), and possibly other types of liquid crystal displays.

Figure 20:
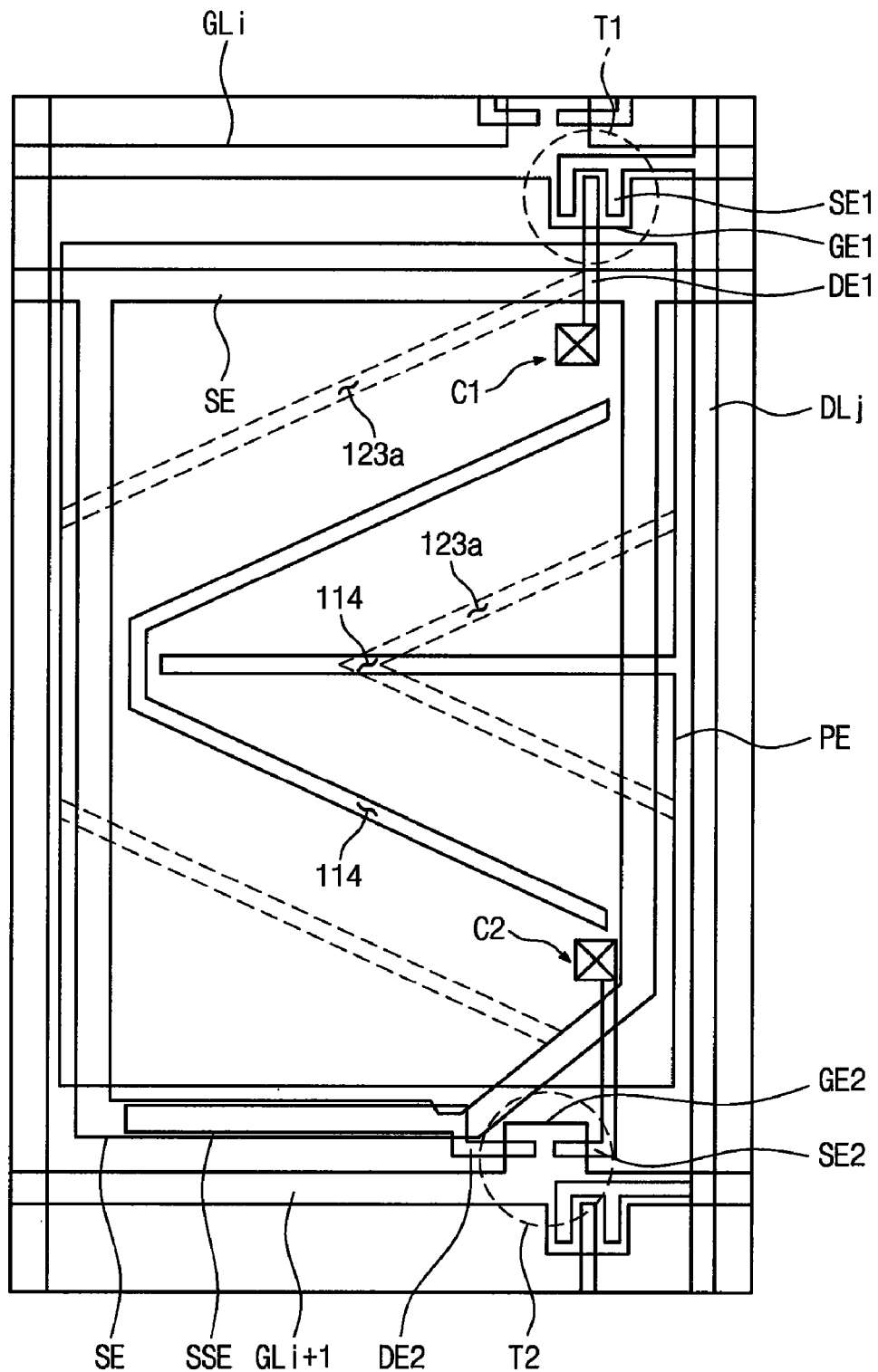
FIG. 20 is a layout view of a pixel according to some embodiments of this invention.

FIG. 20 is a layout drawing of a pixel (i,j) of a liquid crystal display of type PVA (Patterned Vertical Alignment) with a sharing capacitor Csh. The pixel's vertical cross section is similar to the one of FIG. 18. Referring to FIG. 18 and FIG. 20, a gate metal layer is formed over the first base substrate 111 of the array panel to provide gate lines GL1~GLn, first gate electrodes GE1 of the first thin film transistors T1, second gate electrodes GE2 of the second thin film transistors T2, and storage electrodes SE.

Then a gate dielectric film 112 is formed to cover the gate lines GL1-GLn, the first gate electrodes GE1 and the second gate electrodes GE2.

A data metal layer is formed on the gate dielectric film 112 to provide data lines DL1-DLm, first source electrodes SE1 and first drain electrodes DE1 of the first thin film transistors T1, second source electrodes SE2 and second drain electrodes DE2 of the second thin film transistors T2, and sharing electrodes SSE. In each pixel, the sharing electrode SSE branches off from the second drain electrode DE2 and overlies the storage electrode SE. The sharing electrode SSE, the second drain electrode DE2 and the gate dielectric 112 therebetween provide the sharing capacitor Csh.

Overcoat layer 113 is provided to cover the data lines DL1-DLm, the first source electrodes SE1, the second source electrodes SE2, the first drain electrodes DE1, the second drain electrodes DE2 and the sharing electrodes SSE.

The overcoat layer 113 is patterned to form, for each pixel, a first contact hole C1 exposing the first drain electrode DE1, and a second contact hole C2 exposing the second source electrode SE2.

Pixel electrodes PE are formed on the overcoat layer 113 of a transparent conductive material. In each pixel, the pixel electrode PE is coupled to the first drain electrode DE1 through the first contact hole C1 and to the second source electrode SE2 through the second contact hole C2.

Each pixel electrode PE includes a first opening pattern 114 exposing the overcoat layer 113.

A color filter layer 112 and a common electrode 123 are sequentially formed on the second base substrate of the upper panel. The common electrode 123 will overlie the pixel electrodes PE, with the liquid crystal layer therebetween. The common electrode 123 is patterned to provide second opening patterns 123a in the common electrode. In each pixel, the first opening pattern 114 is positioned generally in the middle of a figure formed by two adjacent second opening patterns 123a.

As a result, each pixel (i,j) is divided into several domains. Each domain corresponds to an orientation of the liquid crystal molecules in the presence of an electric field. Eight domains are provided in some embodiments. By providing many different orientations for each pixel, the visibility is made more independent of the viewing angle due to compensation effect. Consequently, the viewing angle is enlarged.

Thus in some embodiments a liquid crystal device with an array panel is provided such that at the start of a current frame, the sharing capacitor is at a voltage obtained in the previous frame, and when the pixel has been charged with a new voltage corresponding to the current frame, the sharing capacitor serves to decrease the pixel voltage magnitude by a value depending on the difference between the new voltage and the previous voltage of the pixel. While a gray changes from a low gray to high gray, an over-shoot happens, and while a gray changes from a high gray to low gray, an under-shoot happens. So, a response speed of liquid crystal can be increased.

In the prior art, a memory device and a compensation circuit are required in order to charge previous voltage and to compensate current voltage based on the previous voltage. This invention does not require those devices and circuits so that is the size of liquid crystal device can be minimized. Although the present invention has been described by way of exemplary embodiments, it should be understood that many changes and substitutions may be made by those skilled in the art without departing from the scope of the present invention. The invention is defined by the appended claims.

What is claimed is:

1. An array panel comprising:
   a lower substrate;
   an upper substrate;
   a first gate line receiving a first gate pulse, the first gate line being arranged on the lower substrate;
   a second gate line receiving a second gate pulse, the second gate line being arranged on the lower substrate;
   a data line receiving a data voltage, the data line being arranged on the lower substrate;
   a liquid crystal capacitor comprising:
   a pixel electrode;
   a common electrode: and
   a liquid crystal layer interposed between the pixel electrode and the common electrode;
   a sharing capacitor comprising:
   a first sharing electrode;
   a second sharing electrode: and
   a first insulating layer interposed between the first sharing electrode and the second sharing electrode;
   a first switching element coupled to the first gate line, the data line, and the liquid crystal capacitor to provide the data voltage to the pixel electrode in response to the first gate pulse; and a second switching element coupled to the second gate line, the liquid crystal capacitor and the sharing capacitor to convert the data voltage of the pixel electrode into a compensated data voltage in response to the second gate pulse,
   wherein the data voltage and the capacitance of the sharing capacitor are determined by the dynamic capacitance of the liquid crystal capacitor.

2. The array panel according to claim 1, wherein the first sharing electrode is formed from the same layer as the data line or the pixel electrode, and
   the second sharing electrode is formed from the same layer as the gate line or the data line.

3. The array panel according to claim 1, wherein the first sharing electrode is formed from the same layer as the data line or the pixel electrode, and
   wherein the the second sharing electrode is formed on the upper substrate.

4. The array panel according to claim 1, wherein the sharing capacitor further comprises a third sharing electrode and a second insulating layer interposed between the first sharing electrode and the third sharing electrode,
   the first sharing electrode and the second sharing electrode are formed on the lower substrate and the third sharing electrode is formed on the upper substrate, and
   the first sharing electrode and the second sharing electrode are partially overlapped each other.

5. The array panel according to claim 1, further comprising a storage capacitor connected to the liquid crystal capacitor,
   wherein the capacitance ratio of the liquid crystal capacitor, the storage capacitor, and the sharing capacitor is about 1:0.75:0.3 in a patterned vertical alignment (PVA) mode.

* * * * *